United States Patent
Mei et al.

(10) Patent No.: US 10,628,725 B1
(45) Date of Patent: Apr. 21, 2020

(54) TAG SYSTEM AND METHODS OF USE

(71) Applicant: Palo Alto Research Center Incorporated, Palo Alto, CA (US)

(72) Inventors: Ping Mei, San Jose, CA (US); Janos Veres, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 16/250,353

(22) Filed: Jan. 17, 2019

(51) Int. Cl.
*G06Q 30/00* (2012.01)
*G06K 19/07* (2006.01)
*H04W 4/35* (2018.01)
*G06K 7/10* (2006.01)

(52) U.S. Cl.
CPC ..... *G06K 19/0724* (2013.01); *G06K 7/10069* (2013.01); *G06K 19/0726* (2013.01); *H04W 4/35* (2018.02)

(58) Field of Classification Search
CPC .......... G06K 19/0702; G06K 19/0716; G06K 19/0717; G06K 19/0723; G06K 19/07309; G06K 19/07318; G06K 19/07345; G06K 7/10009; G06K 7/10217; G06K 7/10257; G06K 7/10267; G06K 7/10336; G06Q 10/06398; G06Q 10/08; G06Q 10/087; G06Q 30/06; G06Q 30/0603; G07F 9/026; G07G 1/0045; G07G 1/009
See application file for complete search history.

(56) References Cited

U.S. PATENT DOCUMENTS

| | | | | |
|---|---|---|---|---|
| 2005/0253723 | A1* | 11/2005 | Shafer | G08B 13/2408 340/572.4 |
| 2011/0140853 | A1* | 6/2011 | Jung | G06K 7/10217 340/10.1 |
| 2012/0040610 | A1* | 2/2012 | Moosavi | H04W 52/0254 455/41.1 |
| 2014/0253333 | A1* | 9/2014 | Patterson | E05B 73/0064 340/572.4 |
| 2016/0056444 | A1* | 2/2016 | Hwang | H01M 2/34 429/7 |
| 2017/0256155 | A1* | 9/2017 | Sengstaken, Jr. | G06F 19/3418 |
| 2018/0093814 | A1* | 4/2018 | Espinosa | A23L 5/15 |
| 2018/0288889 | A1* | 10/2018 | Fordham | H04B 5/0081 |

* cited by examiner

*Primary Examiner* — Thien M Le
(74) *Attorney, Agent, or Firm* — Fox Rothschild LLP

(57) ABSTRACT

Systems and methods for operating a tag system. The methods comprise performing the following operations by a tag having an antenna: emitting a signal at a first frequency spectrum, if the tag is not proximate to a tag modulation marker; and emitting a signal at a second frequency spectrum, if the tag is proximate to the tag modulation marker.

24 Claims, 15 Drawing Sheets

TAG SYSTEM AND METHODS OF USE

BACKGROUND

The present disclosure relates generally to tag systems and methods of use. In the conventional art, Radio Frequency Identification ("RFID") has been broadly used for object identification. However, for a Point Of Sale ("POS") application, it is difficult to tell whether the object with an RFID tag is on a shelf or has been taken off the shelf but still in the vicinity of the same. Although at a given gain of an RFID tag reader the signal strength is inversely proportional to the distance between the reader antenna and the RFID tag, there is no clear distance separation between a strong RF signal and a weak RF signal.

SUMMARY

The present disclosure concerns implementing systems and methods for operating a tag system. The methods comprise the following operations performed by a tag having an antenna: emitting a signal at a first frequency spectrum, if the tag is not proximate to a tag modulation marker (e.g., a glass plate); emitting a signal at a second different frequency spectrum, if the tag is proximate to the tag modulation marker. The signal emitted at the second different frequency spectrum is detectable by a tag reader that is in a certain location, while the signal emitted at the first frequency spectrum is not detectable by the tag reader in the certain location.

In some scenarios, the tag is coupled to a first item and the tag modulation marker is coupled to a second item. The first item comprises an object that is part of an inventory, and the second item comprises storage equipment that is part of an infrastructure for storing inventory (or vice versa). Alternatively, the first item comprises a support plate of an RFID element, and the second item comprises at least one resilient member of the RFID element. In this case, the tag modulation marker is resiliently biased in a direction away from the tag, or the tag is resiliently biased in a direction away from the tag modulation marker. The tag modulation marker is caused to move in a direction towards the tag, or the tag is caused to move in a direction toward the tag modulation marker by placing an object on a structure that includes the tag modulation marker, the tag, and a resilient member.

The tag modulation marker is configured to modulate a communications behavior of the tag. The modulation of the communications behavior of the tag is achieved by changing a resonant frequency of the tag, attenuating an amplitude of a signal generated by the tag, or shifting a phase of the signal generated by the tag.

The location of an object within a facility may be detected when the signal emitted at the second different frequency spectrum is detected by a tag reader. The location may be stored in an enterprise system for inventory tracking purposes.

The present solution also concerns a tag system. The tag system comprises: a tag having an RF antenna coupled to a first item; and a tag modulation marker coupled to a second item and configured to modulate a communications behavior of the tag. The tag is configured to: reject interrogation signals transmitted from a tag reader or emit a signal at a first frequency spectrum when the tag is not within a certain distance range of the tag modulation marker; and emit a second signal at a second different frequency spectrum when the tag is within the certain distance range of the tag modulation marker.

BRIEF DESCRIPTION OF THE DRAWINGS

The present solution will be described with reference to the following drawing figures, in which like numerals represent like items throughout the figures.

DETAILED DESCRIPTION

Figure 1:
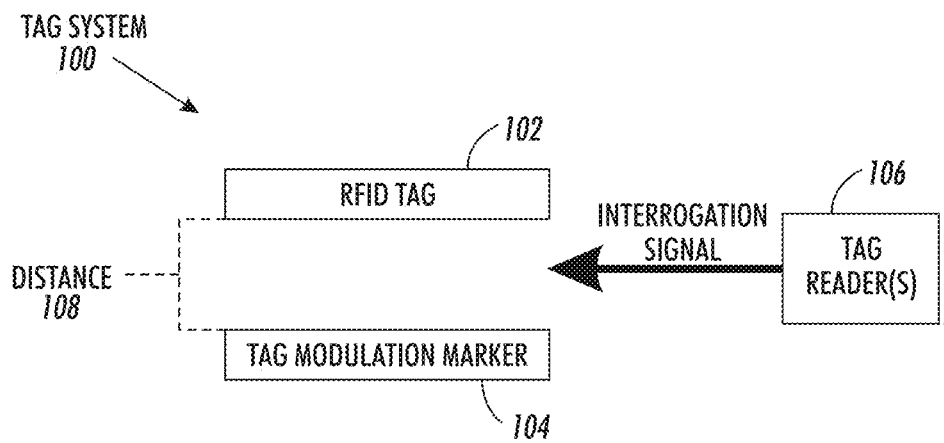
FIGS. 1-2 provide illustrations that are useful for understanding the present solution.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution concerns object identification and object location identification using tags and tag readers. The tags include, but are not limited to, RFID tags, Near Field Communication ("NFC") tags, and/or Bluetooth enabled tags. The tag generally comprises an antenna, a substrate and a communication circuit capable of transmitting and receiving wireless signals. The tag readers can be mobile tag readers or fixed tag readers strategically placed in a facility (e.g., on or below a shelf of a display equipment or as part of a POS checkout counter). Traditionally, RFID technology has been broadly used for object identification. However, for POS applications, it is difficult to tell whether an object with an RFID tag is located on a particular shelf or counter of checkout equipment or has been removed from the shelf or counter but is still in the vicinity of the same. Although at a given gain of a tag reader a signal strength of an RFID signal is inversely proportional to a distance between the tag reader's antenna and an RFID tag, there is no clear distance separation between a strong RFID signal and a weak RFID signal. In the present document, systems and methods are described for object locating and/or inventory tracking based on a novel tag design (e.g., RFID tag design) and alternation.

The present solution has many advantages. For example, the present solution may provide a means to identify a relatively large number of objects or items using a single tag reader, more accurately determine locations of objects and items in a facility (e.g., on particular shelves or display equipment) using one or more tag readers and/or having depressible RFID elements (momentary or bistable) for user remote input command.

The present solution can be used in many applications. These applications include, but are not limited to, POS applications, inventory applications, object tracking applications, and/or any other application in which an object's location needs to be determined. In addition, the solution enables user input wirelessly. The features of the present solution will become more evident as the discussion progresses.

The present solution will be described below in relation to RFID technology. The present solution is not limited in this regard. The present solution can be used with NFC technology, Bluetooth technology or other communication technologies in which modulation of tag communication characteristics is possible.

Illustrative Systems

Figure 2:
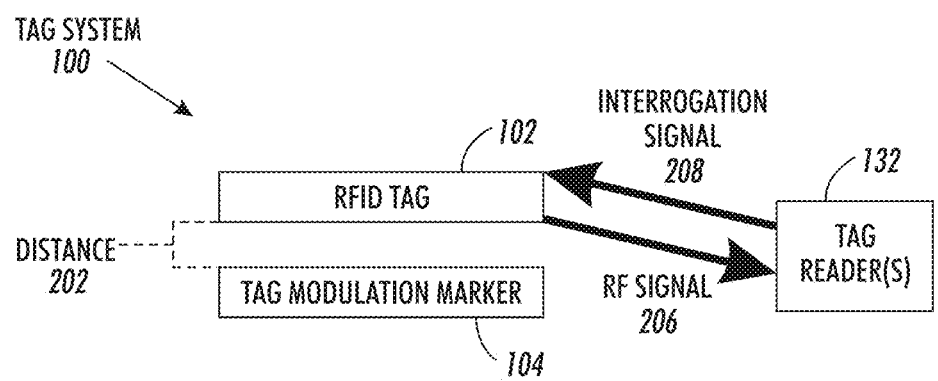

Referring now to FIGS. 1-2, there are provided schematic illustrations that are useful for understanding the present solution. RFID tags are well known in the art for marking and identifying objects. In many applications, it is desirable to measure the exact location of objects with RFID tags. This can be achieved with triangulation systems and/or using multiple antennae, which can be complex and costly. There is a need for simpler and lower cost object location monitoring system.

It has been discovered that RFID tags can be turned into a part of an object identification system able to monitor object location by devising a novel RFID tag system. As shown in FIGS. 1-2, the novel RFID tag system 100 comprises a least one RFID tag 102 and at least one tag modulation marker 104. The tag modulation marker generally comprises a passive structure having physical and material properties that affect communication characteristics of a tag antenna whereby the output signal from the tag is modified. The RFID tag 102 is applied to a first item and the tag modulation marker 104 is applied to a second item. For example, in some scenarios, the first item comprises a piece of merchandise, while the second item comprises a part of infrastructure (e.g., a shelf of display equipment, a box, a wall, etc.). In other scenarios, the first item comprises the infrastructure, and the second item comprises the merchandise. In yet other scenarios, the first item comprises a support plate of an RFID element and the second item comprises at least one resilient member of the RFID element, as evident from the following discussion in relation to FIGS. 4-5. The present solution is not limited to the particulars of this example.

Notably, the RFID tag 102 is designed to communicate at a frequency spectrum that does not allow the tag reader 106 to detect the signal within its operational frequency range when not in proximity (e.g., not within 0-1 mm) of the tag modulation marker 104. This is shown in FIG. 1 where the RFID tag 102 either (1) rejects the interrogation signal since it is outside of its operational frequency range or (2) transmits an RF signal in response to the interrogation signal but the signal is not detected by the tag reader 106, when the RFID tag 102 is a distance 108 from the tag modulation marker 104.

However, the RFID tag 102 is also designed to communicate at a frequency spectrum that allows a tag reader 106 to detect the signal within its operational frequency range when in proximity (e.g., within 0-1 mm) of or in contact with the tag modulation marker 104. This is shown in FIG. 2 where the RFID tag 102 transmits an RF signal 206 that is received by the tag reader 106 since the RFID tag 102 is a smaller distance 202 from, or perhaps even in physical contact with, the tag modulation marker 104.

Therefore, the behavior of the RFID tag 102 is modulated when in proximity with the tag modulation marker 104. More specifically, the tag modulation marker actually causes the RFID tag to change its absorption and transmission signal spectrum when in proximity thereto. When the tag modulation marker is in proximity to the RFID tag, it effectively becomes part of the RFID tag's antenna so that the RFID tag's antenna emits a signal at a different frequency spectrum that allows the tag reader to detect the signal within the tag reader's operational frequency range. Notably, the frequency spectrum is a function of signal frequency versus signal amplitude. The tag modulation marker 104 may modulate the communications behavior of the RFID tag 102, for example, by changing the tag's resonant frequency, enhancing an RFID signal's amplitude, or shifting a phase of the RFID signal. Multiple modulation modes may be employed. The RFID tag 102 may comprise several antennae amenable to more than one modulation mode.

The tag system 100 can be used in a variety of applications. For example, the tag system 100 can be used in retail store applications. Accordingly, an illustrative retail store application of the present solution will now be described in relation to FIGS. 3-12.

Figure 3A:
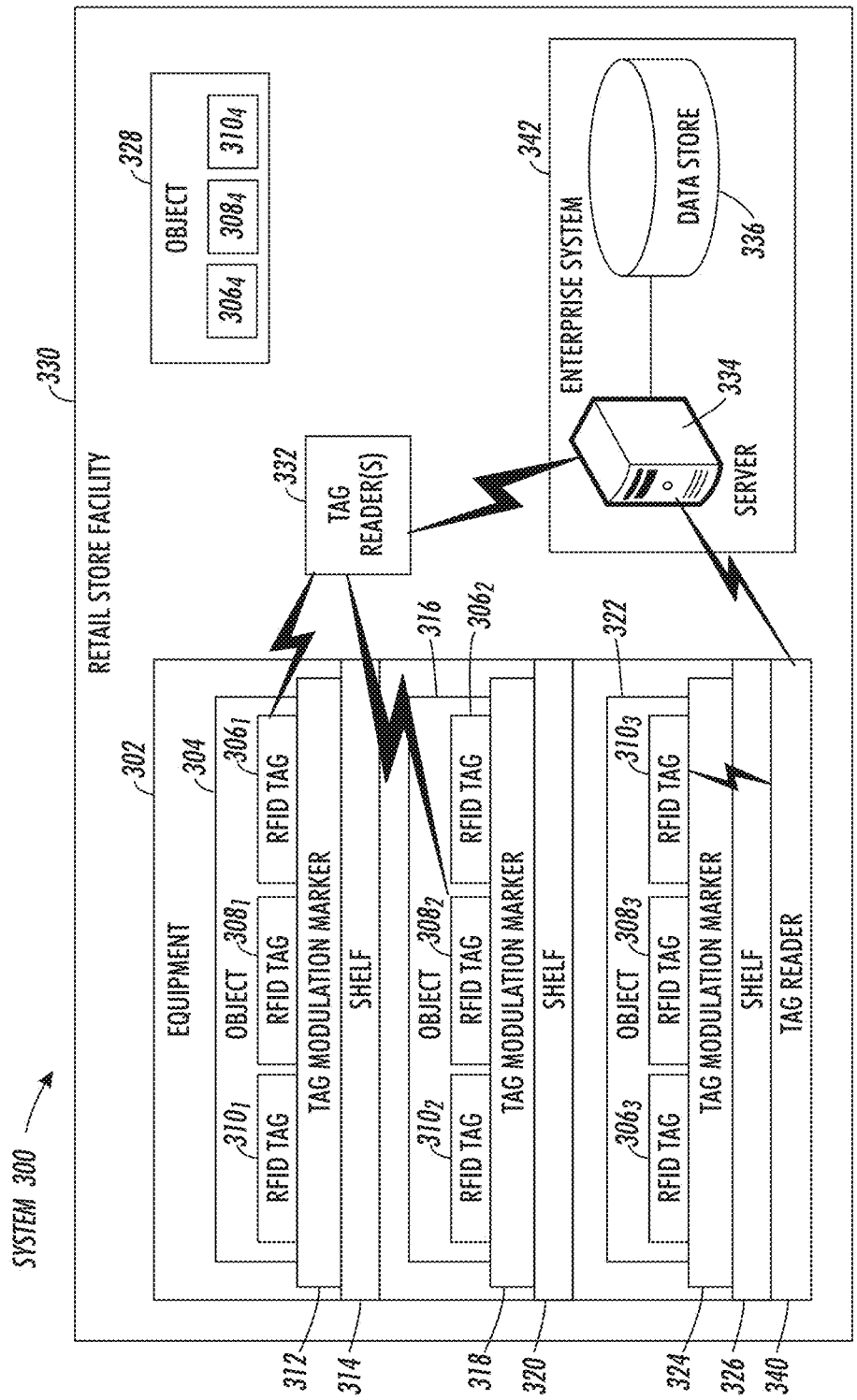
FIGS. 3A-3B (collectively referred to as "FIG. 3") provide illustrations of an illustrative system implementing the present solution.
Figure 3B:
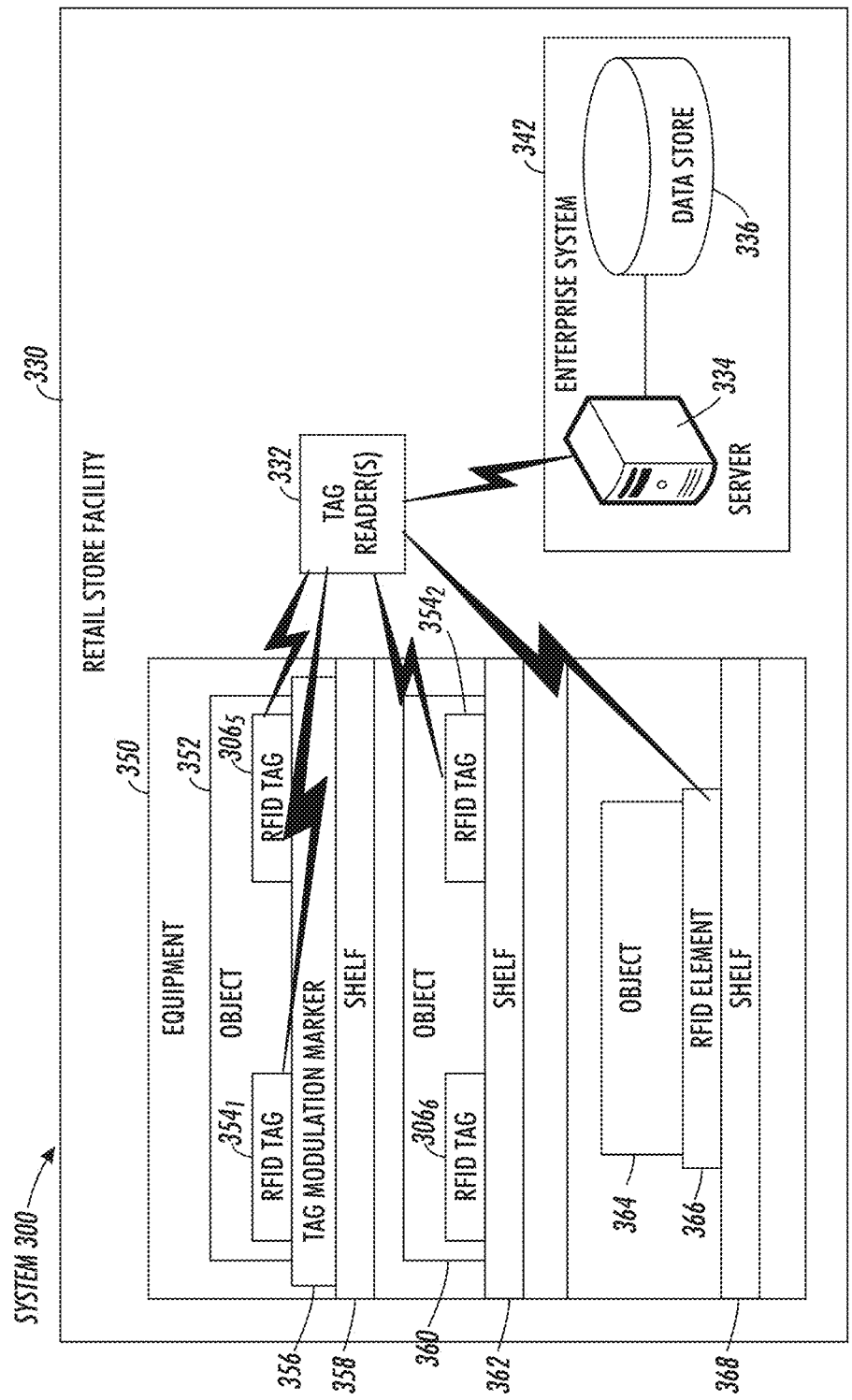

Referring now to FIGS. 3A-3B, there is provided a schematic illustration of an illustrative system 300 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 300 is generally configured to allow improved inventory counts of objects and/or items located within a facility. As shown in FIG. 3, system 300 comprises a Retail Store Facility ("RSF") 330 in which equipment 302 (FIG. 3A), 350 (FIG. 3B) is disposed. The equipment is provided for displaying objects (or items) 304, 316, 322, 328, 352, 360, 364 to customers of the retail store and/or for holding the objects (or items) during a purchase transaction and/or a return transaction. The equipment can include, but is not limited to, shelves, article display cabinets, promotional displays, fixtures, checkout counters, and/or equipment securing areas of the RSF 328. The RSF can also include emergency equipment (not shown) and an EAS system (not shown). Emergency equipment and EAS systems are well known in the art, and therefore will not be described herein.

One or more tag readers 332, 340 are provided to assist in counting the objects 304, 316, 322, 328, 352, 360, 364 located within the RSF 328. Each tag reader 332, 340 comprises an RFID reader configured to read RFID tags. RFID tags $306_1$, $306_2$, $306_3$, $306_4$, $306_5$, $306_6$ (collectively referred to as "306"), $308_1$, $308_2$, $308_3$, $308_4$ (collectively referred to as "308"), $310_1$, $310_2$, $310_3$, $310_4$ (collectively referred to as "310"), $354_1$, $354_2$ (collectively referred to as "354") are respectively attached or coupled to the objects 304, 316, 322, 328, 352, 360, 364. Additionally or alternatively, RFID elements 366 are attached or coupled to the equipment 350 as shown in FIG. 3B so as to create smart equipment (e.g., a smart shelve(s) 368). The RFID elements 366 include RFID tags. The RFID tags are described herein as comprising single-technology tags that are only RFID enabled. The present solution is not limited in this regard. One or more of the RFID tags can alternatively or additionally comprise dual-technology tags that have both EAS and RFID capabilities.

Notably, the RFID tags 306, 308, 310 have unique identifiers assigned thereto such that they can be distinguished from each other. Additionally, each RFID tag comprises an antenna for RF communications. The antenna is designed to be a low efficient antenna which emits RF signals at a frequency spectrum that does not allow the tag reader to detect the signal within its operating frequency range (e.g., 860-960 MHz). However, when the RFID tag's antenna is in physical contact with a tag modulation marker 312, 318, 324, 404 or within a small threshold distance away from the tag modulation marker, at least one of the antenna's operating characteristics is affected. Accordingly at the time that the RFID tag is proximate to the tag modulation marker, the RFID tag is capable of transmitting RFID signals at a different frequency spectrum that allows the tag reader to detect the signals within its operating frequency range (e.g., 2.4 GHz).

The tag modulation markers 312, 318, 324, 356 are formed of a substrate (e.g., glass) with properties selected to affect the resonant frequency, impedance, gain, bandwidth, and/or radiation pattern of an RFID tag antenna. These properties include, but are not limited to, a material type, a shape, a thickness (e.g., 1.0-5.0 mm) and a permittivity (e.g., dielectric constant 4.3). The tag modulation markers can have any shape selected in accordance with a particular application. For example, the tag modulation markers can be rectangular, square, planar, and/or circular. The size of the tag modulation markers is sufficiently large so that it can provide substantial overlap with the tag antenna when they are in proximity. In some scenarios, the tag modulation marker has a dielectric constant of 3-10. In a particular example, the tag modulation marker is a glass plate with a dielectric constant of ~4 and having a thickness of 1-10 mm. The present solution is not limited in this regard.

The tag modulation markers 312, 318, 324, 356 are shown in FIGS. 3A-3B as being disposed on a structure. For example, the tag modulation markers 312, 318, 324, 356 are respectively disposed on shelves 314, 320, 326, 358 of equipment 330, 350. As such, the shelf on which each object resides can be determined by system 300. This provides more accurate object locations as compared to that provided in conventional systems in which object locations are determined to be within a much larger area than a shelf of a particular piece of equipment.

Also, system 300 can detect when an object 328 is removed from a particular shelf. In this regard, it should be understood that the tag readers 332, 340 will not receive RF signals from the removed object 328 since its antenna is no longer in contact with tag modulation marker.

The tag readers 332, 340 are strategically placed at a known location within the RSF 330. For example, the tag reader 332 is placed in proximity to the equipment 350 (e.g., at the end of an aisle or at a checkout counter). The tag reader 340 is disposed adjacent to a particular shelf 326 of the equipment 302. The present solution is not limited in this regard. One or more of the tag readers can be mobile tag readers that are moved into a Zone Of Interest ("ZOI") inside the RSF 330. The ZOI can include any area in the RSF such as a particular aisle and/or a particular section (e.g., the frozen section, the adult women's dress section, changing rooms, stockroom, garden section, entryway, etc.).

By correlating the tag reader's RFID tag reads and the tag reader's known location within the RSF 330, it is possible to determine the location of objects 304, 316, 322, 328, 404, 412, 414 within the RSF 330. The tag reader's known coverage area also facilitates object location determinations. Accordingly, RFID tag read information and tag reader location information is stored in a data store 336. This information can be stored in the data store 336 using a server 334. Server 334 will be described in more detail below in relation to FIG. 8. The sever 334 and the data store 336 are collectively referred to herein as an enterprise system 342.

During operation, system 300 may be used as an object identification and location system. In this scenario, a plurality of objects 304, 316, 322 are provided with RFID tags 306, 308, 310 coupled thereto (e.g., via an adhesive, a clamp, a strap, or other coupling means). More specifically, object 304 has RFID tags $306_1$, $308_1$ and $310_1$ coupled thereto. Object 316 has RFID tags $306_2$, $308_2$ and $310_2$ coupled thereto. Object 322 has RFID tags $306_3$, $308_3$ and $310_3$ coupled thereto. The objects are respectively placed on shelves 314, 320, 326 of equipment 302.

At least one tag reader 332, 340 is placed in proximity to the equipment 302. For example, tag reader 340 is located adjacent to a shelf 326 so as to reside a certain distance (e.g., 1 inch) from the tag modulation marker 324 disposed on the shelf. In contrast, tag reader 332 is located adjacent to the equipment 302 so as to reside a certain distance from shelves 314, 320 on which tag modulation markers 312, 318 are disposed. The present solution is not limited in this regard.

Each shelf of the equipment 302 has a tag modulation marker 312, 318, 324 disposed thereon. The tag modulation markers have the same or different properties (e.g., shapes, thicknesses and/or dielectric constants). In both cases, the antennas of the RFID tags are designed such that: RFID tags $306_1$, $306_2$, $306_3$ communicate RF signals at a frequency spectrum that allows the tag reader 332 to detect the signals within its operating frequency range only when their antennas are in contact with the tag modulation marker 312; RFID tags $308_1$, $308_2$, $308_3$ communicate RF signals at a frequency spectrum that allows the tag reader 332 to detect the signals within its operating frequency range only when their antennas are in contact with the tag modulation marker 318; and RFID tags $310_1$, $310_2$, $310_3$ communicate RF signals at a frequency spectrum that allows the tag reader 332 to detect the signals within its operating frequency range only when their antennas are in contact with the tag modulation marker 324 (as shown in FIG. 3A).

The RF signals communicated from the RFID tags 306, 308, 310 contain the unique identifiers thereof. The tag reader 332, 340 process the RF signals to obtain the unique identifiers. The unique identifiers and timestamps are then communicated from the tag readers 332, 340 to the enterprise system 342. At the enterprise system, the unique identifiers and timestamps are stored in a data store 336 for object location and/or inventory purposes. The object locations reflect the shelf on which each object is disposed.

When an object 328 is removed from a shelf 314, 320 or 326, its location is no longer detectable by the tag readers 332, 340 since the RFID tags $306_4$, $308_4$, $310_4$ either (1) reject interrogation signals sent from the tag readers or (2) accept the interrogation signals but transmit RF signals at a frequency spectrum that does not allow the tag reader to detect the same at its operating frequency ranges. Interrogation signals are well known in the art, and therefore will not be described herein.

In some scenarios, conventional RFID tags $354_1$, $354_2$ are coupled to objects 352, 360 in the RSF 330 in addition to the novel RFID tags $306_5$, $306_6$ with low efficient antennas as shown in FIG. 3B. The conventional RFID tags $354_1$, $354_2$ are designed to emit signals at a frequency spectrum that allows tag readers to detect the same within its operating frequency range even when not in proximity or adjacent to a tag modulation marker 312, 318, 324, 356. Accordingly, when the objects 352, 360 are placed on shelf 358 with tag modulation marker 356, both RFID tags $306_5$, $354_1$ or $306_6$, $354_2$ communicate RF signals at a frequency spectrum that allows tag readers to detect the same within its operating frequency range. However, when the objects 352, 360 are placed on shelf 358 without a tag modulation marker, only the conventional RFID tags $354_1$, $354_2$ communicate such signals, i.e., the RFID tags $306_5$, $306_6$ communicate RF signals at a frequency spectrum that does not allow tag readers to detect the signals within its operating frequency range. In this way, the tag reader 332 and/or enterprise system 342 can detect when the objects 352, 360 are on shelf 358 or shelf 362 of equipment 342. A detection is made that an object is on shelf 358 when both RFID tags $306_5$, $354_1$ or $306_6$, $354_2$ communicate RF signals detected by the tag reader 332. In contrast, a detection is made that an object is on shelf 358 when only one of the RFID tags $354_1$, $354_2$ communicates an RF signal detected by the tag reader 332.

In those or other scenarios, one or more parts of equipment 350 are transformed into smart parts. For example, shelf 368 of equipment 350 is transformed into a smart shelf through the use of RFID element 366. The RFID element 366 is generally configured to cause an RF signal to be received by a tag reader 332 when an object 364 is placed thereon. Thus, in this embodiment the object does not need to have a tag attached to it, but the shelf may have an RFID tag that emits a particular signal when an object is placed on the shelf.

Figure 4:
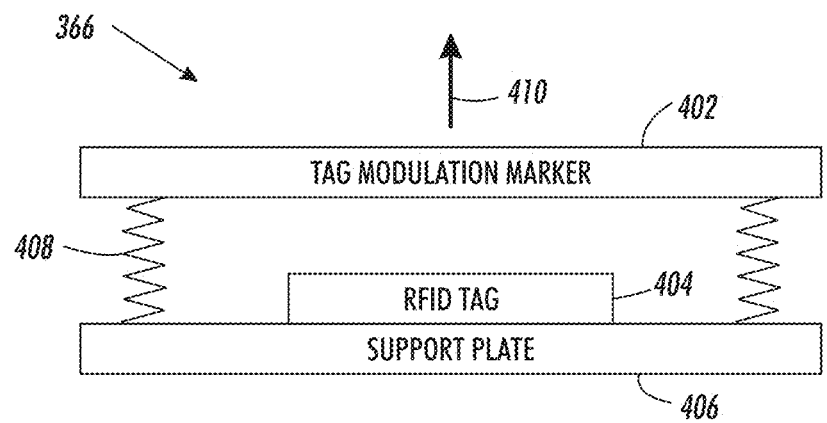
FIGS. 4-5 provide illustrations that are useful for understanding operations of the RFID element shown in FIG. 3.
Figure 5:
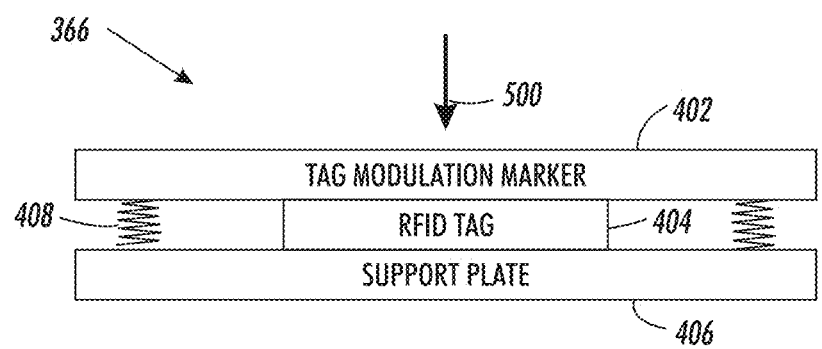

Operations of the tag system 100 as a use input embodiment will now be described in relation to FIGS. 4-5. As shown in FIGS. 4-5, the RFID element 366 comprises a tag modulation marker 402, an RFID tag 404 with a low efficient antenna, a support plate 406, and resilient members 408. The tag modulation marker 402 resides above the RFID tag 404. Both the tag modulation marker 402 and the RFID tag 404 are mechanically supported by support plate 406. The support plate 406 is resiliently biased in a direction 410 away from the support plate 406 by resilient members 408. The resilient members 408 include, but are not limited to, springs, elastic sponges, elastomeric structures or any other deformable items. The resilient members 408 are deformable such that the tag modulation marker 402 can be transitioned from its unengaged state shown in FIG. 4 to its engaged state shown in FIG. 5 via an application of a pushing force thereto. In the unengaged state, the tag modulation marker 402 is spaced apart from the RFID tag 404. In the engaged state, the tag modulation marker 402 is adjacent or in contact with the RFID tag 404. Accordingly, an RFID signal is detected by the tag reader 332 from the RFID tag 404 when a user pushes this button or an object 364 is placed on the RFID element 366, as shown in FIG. 3B. An RFID signal is not detected by the tag reader 332 from the RFID tag 404 when the button is not pushed or the object 364 is removed therefrom and when no other object resides thereon.

The present solution is not limited to the vertical movement of the tag modulation marker. In other scenarios, the tag modulation marker and RFID tag are configured to move horizontally relative to each other.

Figure 6:
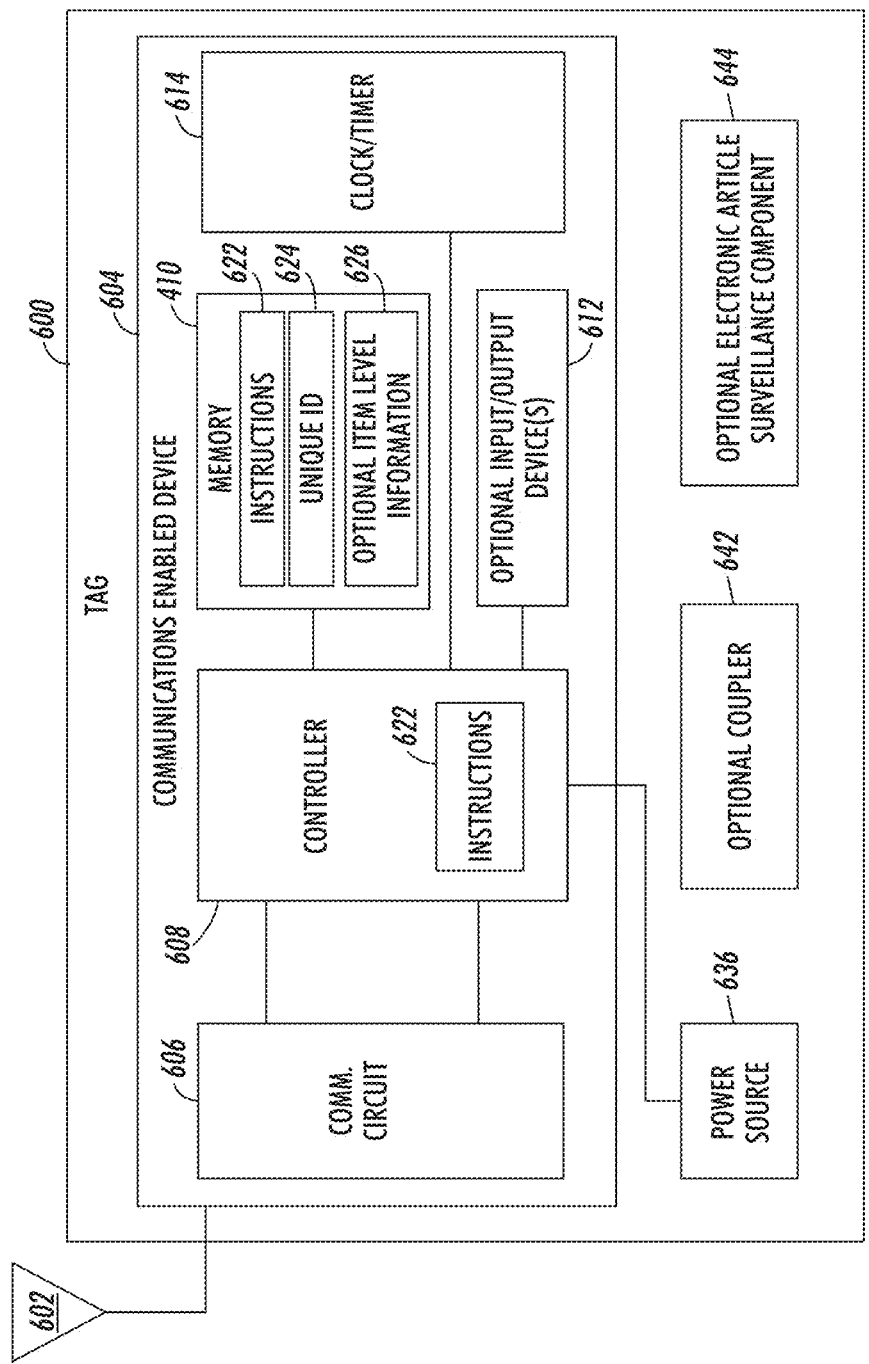
FIG. 6 is a block diagram of an illustrative tag.

Referring now to FIG. 6, there is an illustration of an illustrative architecture for an active tag 600. RFID tags $306_1, \ldots, 306_6, 308_1, \ldots, 308_4, 310_1, \ldots, 310_4, 354_1, 354_2$ may be the same as or similar to tag 600. As such, the discussion of tag 600 is sufficient for understanding the RFID tags $306_1, \ldots, 306_6, 308_1, \ldots, 308_4, 310_1, \ldots, 310_4, 354_1, 354_2$ of FIG. 3.

The tag 600 can include more or less components than that shown in FIG. 6. However, the components shown are sufficient to disclose an illustrative embodiment implementing the present solution. Some or all of the components of the tag 600 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 6 represents a representative tag 600 configured to facilitate improved inventory management. In this regard, the tag 600 is configured for allowing data to be exchanged with an external device (e.g., tag readers 332, 340 of FIG. 3 and/or server 334 of FIG. 3) via wireless communication technology. The wireless communication technology can include, but is not limited to, RFID technology. RFID technology is well known in the art, and therefore will not be described in detail herein. Any known or to be known RFID technology can be used herein without limitation.

The components 606-614 shown in FIG. 6 may be collectively referred to herein as a communication enabled device 604, and include a memory 610 and a clock/timer 614. Memory 610 may be a volatile memory and/or a non-volatile memory. For example, the memory 610 can include, but is not limited to, Random Access Memory ("RAM"), Dynamic RAM ("DRAM"), Static RAM ("SRAM"), Read Only Memory ("ROM") and flash memory. The memory 410 may also comprise unsecure memory and/or secure memory.

As shown in FIG. 6, the communication enabled device 604 is coupled to at least one antenna 602 for allowing data to be exchanged with the external device via a wireless communication technology (e.g., an RFID technology). The antenna 602 is configured to receive signals from the external device and/or transmit signals generated by the communication enabled device 604. The antenna 602 can comprise a low efficient antenna (i.e., an antenna which cannot, by itself, emit a signal at a proper frequency spectrum to be read by an RFID reader located a certain distance away), or a near-field or a far-field antenna.

The low efficient antenna is designed to: facilitate communications at a frequency spectrum that does not allow a tag reader to detect signals within its operational frequency range when not in proximity (e.g., not within 0-500 microns) of a tag modulation marker; and facilitate communications at a frequency spectrum that allows the tag reader to detect signals within its operational frequency range when in proximity (e.g., within 0-500 microns) of the tag modulation marker. Therefore, the behavior of the tag 600 may be modulated when in proximity with a tag modulation marker. The tag modulation marker may modulate the behavior of the RFID tag 600, for example, by changing the tag's resonant frequency, attenuating an RFID signal's amplitude, or shifting a phase of the RFID signal. Multiple modulation modes may be employed. The tag 600 may comprise a plurality of low efficient antennas respectively configured to operate in a plurality of modulation modes. In this scenarios, the low efficient antennas can have different metal thicknesses, trace widths, trace shapes, substrate thicknesses, substrate dielectric constants, and types of conductive materials. By adjusting these properties of an antenna, the following can be provided: a frequency shift, an increase in a signal strength, or a change in Q value.

The communication enabled device 604 also comprises a communications circuit 606. Communications circuits are well known in the art, and therefore will not be described herein. Any known or to be known communications circuit can be used herein provided that it supports RFID communications. For example, in some scenarios, the communications circuit comprises a transceiver. In other scenarios, the communications circuit comprises a receiver and is configured to provide a backscatter response.

During operation, the communications circuit 606 processes received signals (e.g., RF signals) transmitted from external devices to determine whether it should transmit a response signal (e.g., RF carrier signal) to external devices or provide a backscatter response to the external device. In this way, the communication enabled device 604 facilitates the registration, identification, location and/or tracking of an item to which the tag 600 is coupled.

Various information can be included in the response signal. This information includes, but is not limited to, item level information 626 and a unique identifier ("ID") 624. This information 626, 624 is stored in memory 610 of the communication enabled device 604. A timestamps may also be included in the response signal. The item level information includes, but is not limited to, an item description, an item price, and/or a currency symbol.

The communication enabled device 604 also comprises a controller 608 (e.g., a CPU) and input/output devices 612. The controller 608 can execute instructions 622 implementing methods for facilitating inventory counts and management. In this regard, the controller 608 includes a processor (or logic circuitry that responds to instructions) and the memory 610 includes a computer-readable storage medium on which is stored one or more sets of instructions 622 (e.g., software code) configured to implement one or more of the methodologies, procedures, or functions described herein. The instructions 622 can also reside, completely or at least partially, within the controller 608 during execution thereof by the tag 600. The memory 610 and the controller 608 also can constitute machine-readable media. The term "machine-readable media", as used here, refers to a single medium or multiple media (e.g., a centralized or distributed database, and/or associated caches and servers) that store the one or more sets of instructions 622. The term "machine-readable media", as used here, also refers to any medium that is capable of storing, encoding or carrying a set of instructions 622 for execution by the tag 600 and that cause the tag 600 to perform any one or more of the methodologies of the present disclosure.

The optional input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 600.

The clock/timer 614 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 600 also comprises an optional coupler 642 is provided to securely or removably couple the tag 600 to an object. The coupler 642 includes, but is not limited to, a mechanical coupling means (e.g., a strap, clip, clamp, snap) and/or adhesive (e.g., glue or sticker). The coupler 642 is optional since the coupling can be achieved via a weld and/or chemical bond.

The tag 600 can also include a power source 636, and/or an optional Electronic Article Surveillance ("EAS") component 644. Each of the listed components 636, 644 is well known in the art, and therefore will not be described herein. Any known or to be known power source and/or EAS component can be used herein without limitation. The power source 636 can include, but is not limited to, a rechargeable battery, a capacitor and/or an energy harvesting circuit.

The present solution is not limited to the tag architecture shown in FIG. 6. In some scenarios, the tag is a passive tag rather than an active tag. An illustration of an illustrative passive tag 1400 is provided in FIG. 14. RFID tags 306$_1$, . . . , 306$_6$, 308$_1$, . . . , 308$_4$, 310$_1$, . . . , 310$_4$, 354$_1$, 354$_2$ may be the same as or similar to passive tag 1400. As such, the discussion of tag 1400 is sufficient for understanding the RFID tags 306$_1$, . . . , 306$_6$, 308$_1$, . . . , 308$_4$, 310$_1$, . . . , 310$_4$, 354$_1$, 354$_2$ of FIG. 3.

Figure 14:
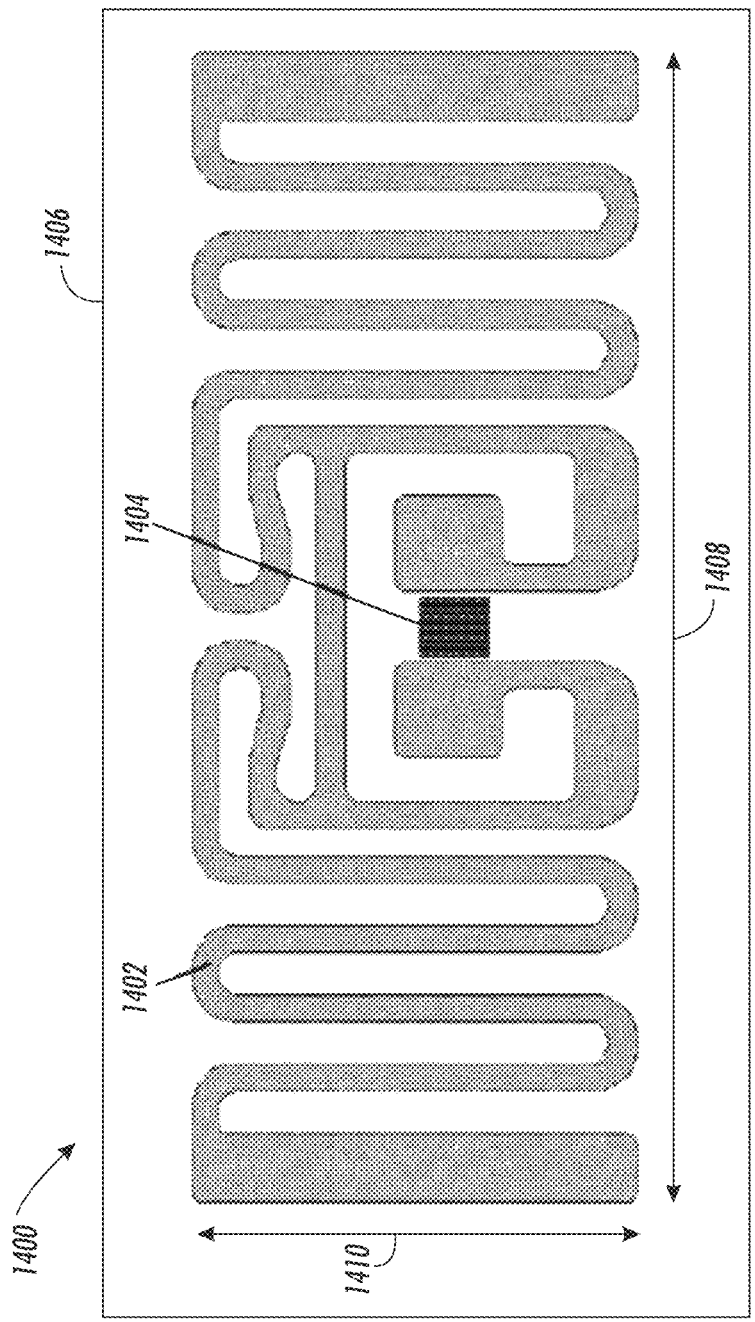
FIG. 14 is an illustration of another illustrative tag.

The tag 1400 can include more or less components than that shown in FIG. 14. However, the components shown are sufficient to disclose an illustrative embodiment implementing the present solution. Some or all of the components of the tag 600 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 14 represents a representative tag 1400 configured to facilitate improved inventory management. In this regard, the tag 1400 is configured for allowing data to be exchanged with an external device (e.g., tag readers 332, 340 of FIG. 3 and/or server 334 of FIG. 3) via wireless communication technology. The wireless communication technology can include, but is not limited to, RFID technology. RFID technology is well known in the art, and therefore will not be described in detail herein. Any known or to be known RFID technology can be used herein without limitation.

In general, a passive RFID tag 1400 is comprises of three parts: antenna 1402 for receiving and transmitting information; an RFID Integrated Circuit ("IC") chip 1404 for storing and processing information; and a substrate 1406. RFID IC chips are well known in the art, and therefore will not be described herein. Any known or to be known RFID IC chip can be used herein without limitation.

Notably, the RFID tag 1400 does not have an internal power supply. This RFID system relies on the exchange of power and information between the tag reader and the tag. The tag reader provides power and communicates with the tag over an RF link. The tag communicates back to the tag reader with data by backscattering a signal from the tag reader.

As shown in FIG. 6, the IC chip 1404 is coupled to at least one antenna 1402 for allowing data to be exchanged with the external device via a wireless communication technology (e.g., an RFID technology). The antenna 1402 is configured to receive signals from the external device and/or transmit signals generated by the IC chip 1404. The performance of the antenna is mainly determined by the geometry design and the conductivity of the antenna, as well as the geometric and dielectric properties of the substrate 1406. In some scenarios, the antenna is a patch antenna made by printing techniques, such as inkjet, extrusion or screen printing. The antenna can also be made by stamping or laser cutting metal foil. The substrate can be selected from but not limited to polymer, PVC, Polyethylenetherephtalate ("PET"), phenolics, polyesters, styrene, paper, and PCB. The antenna 602 can comprise a low efficient antenna (i.e., an antenna which cannot, by itself, emit a signal having adequate strength and/or the proper frequency to be read by an RFID reader located a certain distance away), or a near-field or a far-field antenna.

The low efficient antenna is designed to: facilitate communications at a frequency spectrum that does not allow a tag reader to detect signals within its operational frequency range when not in proximity (e.g., not within 0-1 mm) of a tag modulation marker; and facilitate communications at a frequency spectrum that allows a tag reader to detect signals within its operational frequency range when in proximity (e.g., within 0-1 mm) of the tag modulation marker. Therefore, the behavior of the tag 600 may be modulated when in proximity with a tag modulation marker. The tag modulation marker may modulate the behavior of the RFID tag 600, for example, by changing the tag's resonant frequency, attenuating an RFID signal's amplitude, or shifting a phase of the RFID signal. Multiple modulation modes may be employed. The tag 600 may comprise a plurality of low efficient antennas respectively configured to operate in a plurality of modulation modes. In this scenarios, the low efficient antennas can have different metal thicknesses, trace widths, trace shapes, substrate thicknesses, substrate dielectric constants, and types of conductive materials. By adjusting these properties of an antenna, the following can be provided: a frequency shift, an increase in a signal strength, or a change in Q value.

During operation, the IC chip 1404 processes received signals (e.g., RF signals) transmitted from external devices to determine whether it should transmit a response signal (e.g., RF carrier signal) to external devices or provide a backscatter response to the external device. In this way, the IC chip 1404 facilitates the registration, identification, location and/or tracking of an item to which the tag 1400 is coupled.

Various information can be included in the response signal. This information includes, but is not limited to, item level information and a unique ID. This information is stored in memory of the IC chip 1404. A timestamps may also be included in the response signal. The item level information includes, but is not limited to, an item description, an item price, and/or a currency symbol.

Figure 7:
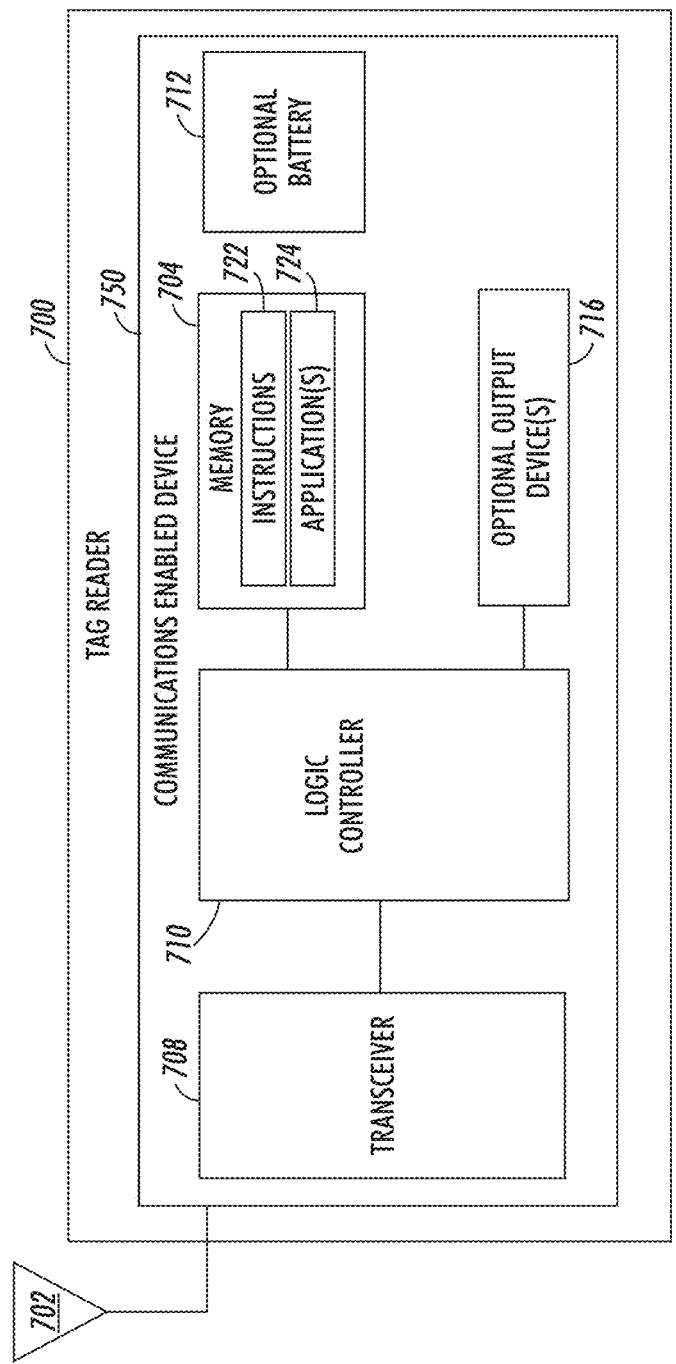
FIG. 7 is a block diagram of an illustrative tag reader.

Referring now to FIG. 7, there is provided a detailed block diagram of an illustrative architecture for a tag reader 700. Tag readers 332, 340 of FIG. 3 may be the same as or similar to tag reader 700. As such, the discussion of tag reader 700 is sufficient for understanding tag readers 332, 340.

Tag reader 700 may include more or less components than that shown in FIG. 7. However, the components shown are sufficient to disclose an illustrative embodiment implementing the present solution. Some or all of the components of the tag reader 700 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 7 represents an illustration of a representative tag reader 700 configured to facilitate improved inventory counts and management within an RSF (e.g., RSF 330 of FIG. 1). In this regard, the tag reader 700 comprises a communications enabled device 5750 for allowing data to be exchanged with an external device (e.g., RFID tags 306, 308, 310, 354 of FIG. 3) via one or more communication technologies. The components 704-716 shown in FIG. 7 may be collectively referred to herein as the communication enabled device 750, and may include an optional power source 712 (e.g., a battery) or be connected to an external power source (e.g., an AC mains).

The communications enabled device 750 comprises an antenna 702 for allowing data to be exchanged with the external device via RF technology (e.g., RFID technology), Short Range Communication ("SRC") technology, Near Field Communication ("NFC") technology and/or Bluetooth technology. The external device may comprise RFID tags 306, 308, 310, 354 of FIG. 3. In this case, the antenna 702 is configured to transmit RF carrier signals (e.g., interrogation signals) to the listed external devices, and/or transmit data response signals (e.g., authentication reply signals) generated by the communications enabled device 750. In this regard, the communications enabled device 750 comprises a transceiver 708. Transceivers are well known in the art, and therefore will not be described herein. However, it should be understood that the transceiver 708 receives signals including information from the transmitting device, and forwards the same to a logic controller 710 for extracting the information therefrom.

The extracted information can be used to determine the presence, location and/or type of object within a facility (e.g., RSF 330 of FIG. 1). Accordingly, the logic controller 710 can store the extracted information in memory 704, and execute algorithms using the extracted information. For example, the logic controller 710 can correlate tag reads with beacon reads to determine the location of the RFID tags within the facility. Other operations performed by the logic controller 710 will be apparent from the following discussion.

Notably, memory 704 may be a volatile memory and/or a non-volatile memory. For example, the memory 704 can include, but is not limited to, a RAM, a DRAM, an SRAM, a ROM, and a flash memory. The memory 704 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 722 are stored in memory for execution by the communication enabled device 750 and that cause the communication enabled device 750 to perform any one or more of the methodologies of the present disclosure. The instructions 722 are generally operative to facilitate determinations as to whether or not RFID tags are present within a facility, and/or where the RFID tags are located within a facility. Other functions of the communication enabled device 750 will become apparent as the discussion progresses.

Figure 8:
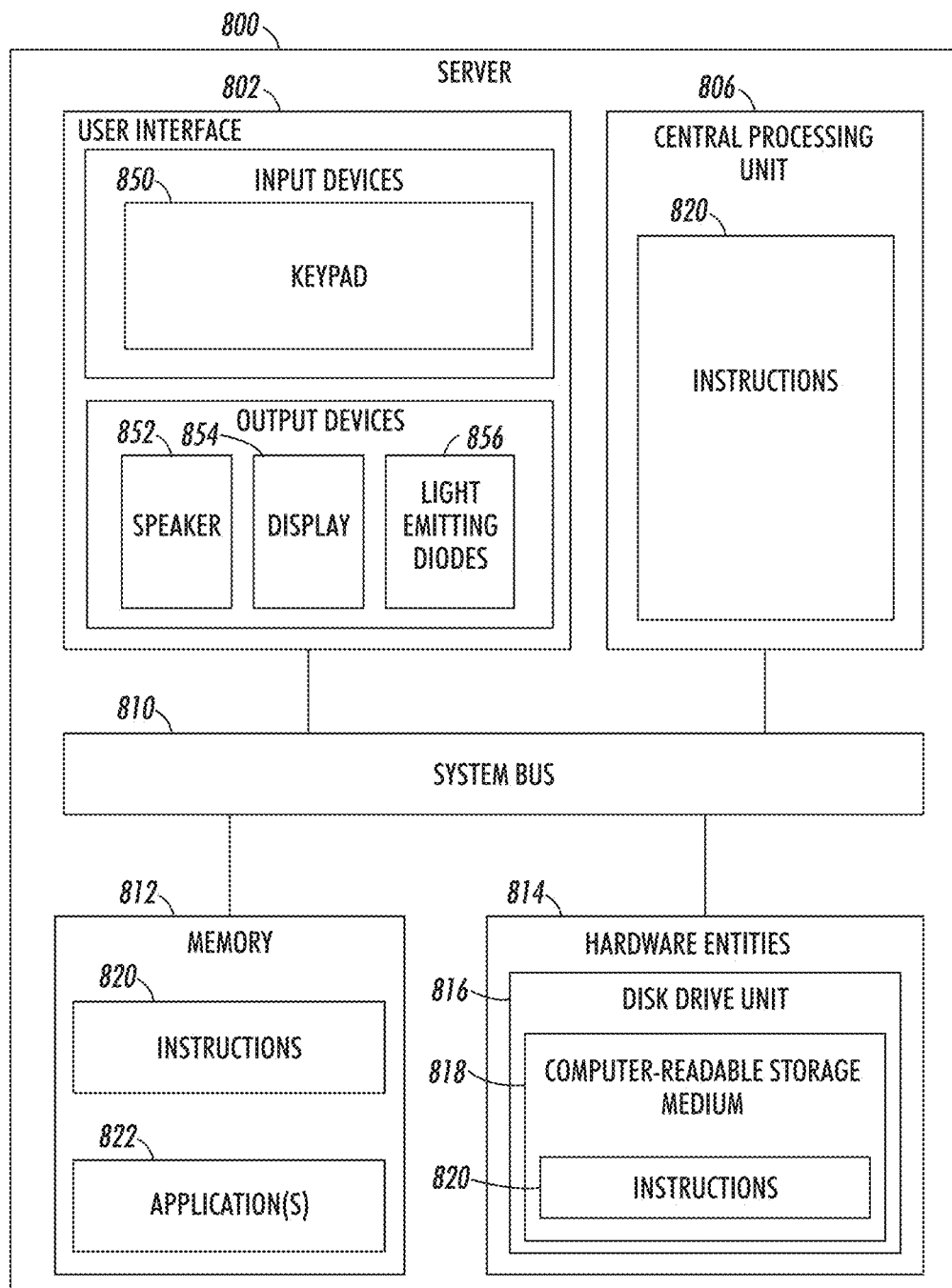
FIG. 8 is a block diagram of an illustrative server.

Referring now to FIG. 8, there is provided a detailed block diagram of an example architecture for a server 800. Server 334 of FIG. 3 may be the same as or substantially similar to server 800. As such, the following discussion of server 800 is sufficient for understanding server 334. Notably, the present solution can operate without use of a server.

Notably, the server 800 may include more or less components than those shown in FIG. 8. However, the components shown are sufficient to disclose an illustrative embodiment implementing the present solution. The hardware architecture of FIG. 8 represents one embodiment of a representative server configured to facilitate inventory counts and management. As such, the server 800 of FIG. 8 implements at least a portion of a method for determining inventory using time slotted tag communications in accordance with the present solution.

Some or all the components of the server 800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the server 800 comprises a user interface 802, a CPU 806, a system bus 810, a memory 812 connected to and accessible by other portions of server 800 through system bus 810, and hardware entities 814 connected to system bus 810. The user interface can include input devices (e.g., a keypad 850) and output devices (e.g., speaker 852, a display 854, and/or light emitting diodes 856), which facilitate user-software interactions for controlling operations of the server 800.

At least some of the hardware entities 814 perform actions involving access to and use of memory 812, which can be a RAM, a disk driver and/or a Compact Disc Read Only Memory ("CD-ROM"). Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the server 800. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the server 800 and that cause the server 800 to perform any one or more of the methodologies of the present disclosure.

In some scenarios, the hardware entities 814 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 822 installed on the server 800. The software application 822 is generally operative to facilitate: the determination of RFID tag locations within a facility; the direction of travel of RFID tags in motion; and the mapping of the RFID tag locations and movements in a virtual three dimensional space. Other functions of the software application 822 will become apparent as the discussion progresses. Such other functions can relate to tag reader control and/or tag control.

Illustrative Methods

Figure 9:
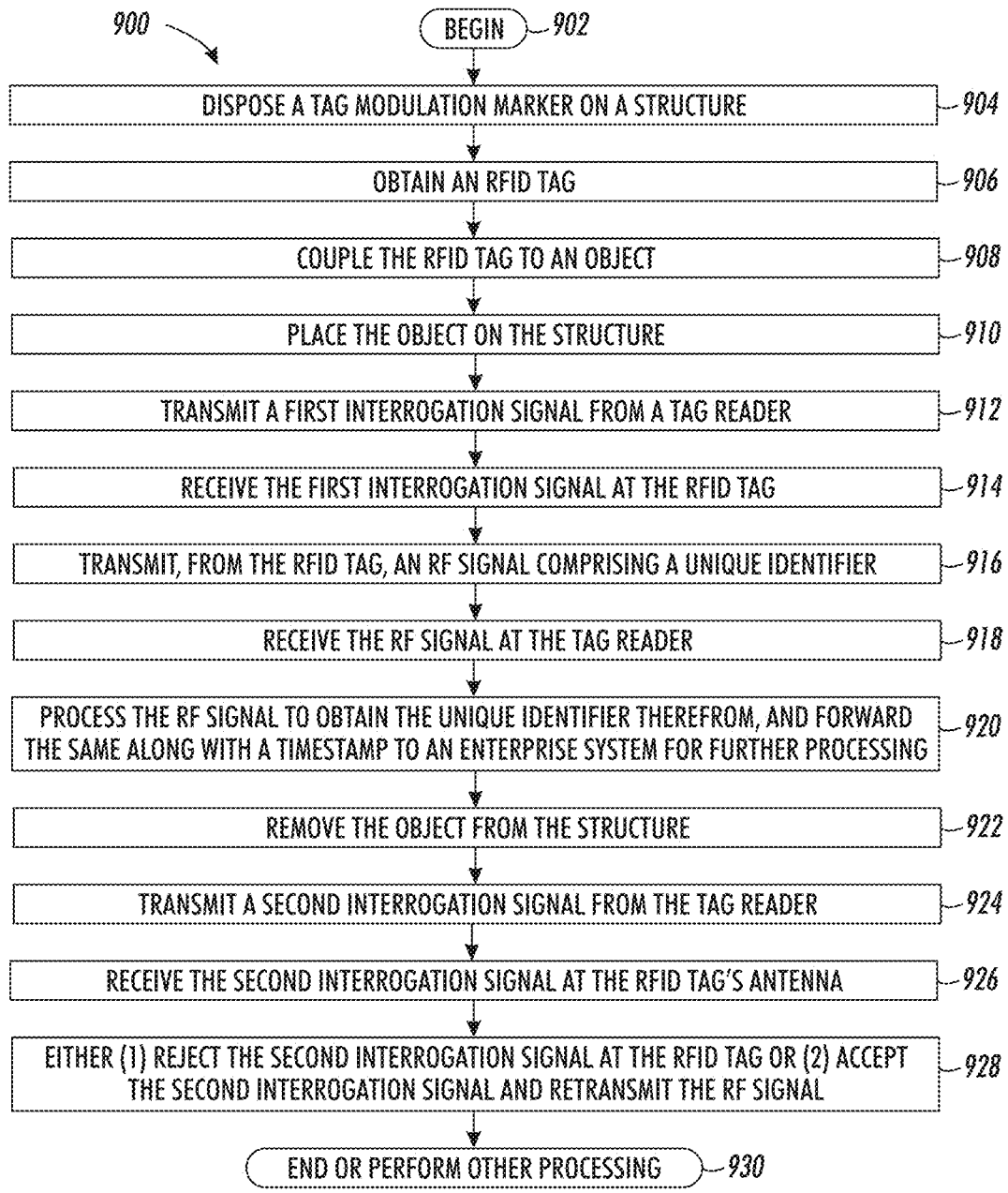
FIG. 9 provides a flow diagram of an illustrative method for detecting an object's location in a facility.

Referring now to FIG. 9, there is provided a flow diagram of an illustrative method 900 for detecting an object's (e.g., object 304, 316, 322, 328, 352, 360 or 364 of FIG. 3) location in a facility (e.g., RSF 330 of FIG. 3). Method 900 begins with 902 and continues with 904 where a tag modulation marker (e.g., tag modulation marker 312, 318, 324, 356 of FIG. 3) is disposed on a structure (e.g., equipment 302, 350 and/or shelf 314, 320, 326, 358, 362, 368 of FIG. 3). In 906, an RFID tag (e.g., RFID tag 306, 308, 310 of FIG. 3) is obtained. The RFID tag comprises a low efficient antenna (e.g., antenna 602 of FIG. 6). The low efficient antenna is configured to transmit and receive RF signals at a first frequency (e.g., 860-960 MHz) that is outside of an operational frequency range of a tag reader (e.g., tag reader 332 and/or 340 of FIG. 3), and/or at a first signal strength that provides a coverage area exclusive of the tag reader when the RFID tag is not proximate to the tag modulation marker. However, the low efficient antenna is also configured to transmit RF signals at a frequency that is within the operational frequency range of the tag reader and at a second signal strength that enables it to reach the tag reader when the RFID tag is in contact with or within a threshold distance from the tag modulation marker. The RFID tag is then coupled to the object in 908.

The object is then placed on the structure such that the RFID tag is in proximity (e.g., 0-1 mm) to the tag modulation marker. While the RFID tag is disposed on the structure that includes the tag modulation marker, a first interrogation signal is transmitted from the tag reader at a second frequency (e.g., 2.4 GHz) different from the first frequency and/or at a second signal strength different from the first signal strength, as shown by 912. The first interrogation signal is received by the RFID tag in 914. In response to the first interrogation signal, an RF signal is transmitted from the RFID tag in 916 at a frequency within the tag reader's optional frequency range and at a relatively strong signal strength (e.g., a signal strength that provides a coverage area inclusive of the tag reader), whereby the RF signal is detectable by the tag reader. The RF signal comprises a unique identifier. In 918, the RF signal is received at the tag reader. The tag reader processes the RF signal to obtain the unique identifier therefrom, as shown by 920. The unique identifier is optionally sent along with a timestamp from the tag reader to an enterprise system (e.g., enterprise system 342 of FIG. 3) for further processing.

Thereafter in 922, the object is removed from the structure. The tag reader periodically transmits interrogation signals to read tags within its coverage area. Therefore, at some time after the object is no longer disposed on the structure, a second interrogation signal is transmitted from the RFID reader, as shown by 924. The second interrogation signal is received at the RFID tag's antenna in 926. Since the RFID tag is not in proximity to the tag modulation marker, it either (1) rejects the second interrogation signal whereby the RF signal is not retransmitted from the RFID tag in response to the second interrogation signal, or (2) accepts the second interrogation signal and retransmits the RF signal at a relatively weak signal strength (e.g., a signal strength that provides a coverage area exclusive of the tag reader) whereby the RF signal is not received by the tag reader, as shown by 928. Subsequently, 930 is performed where method 900 ends or other processing is performed.

Figure 10A:
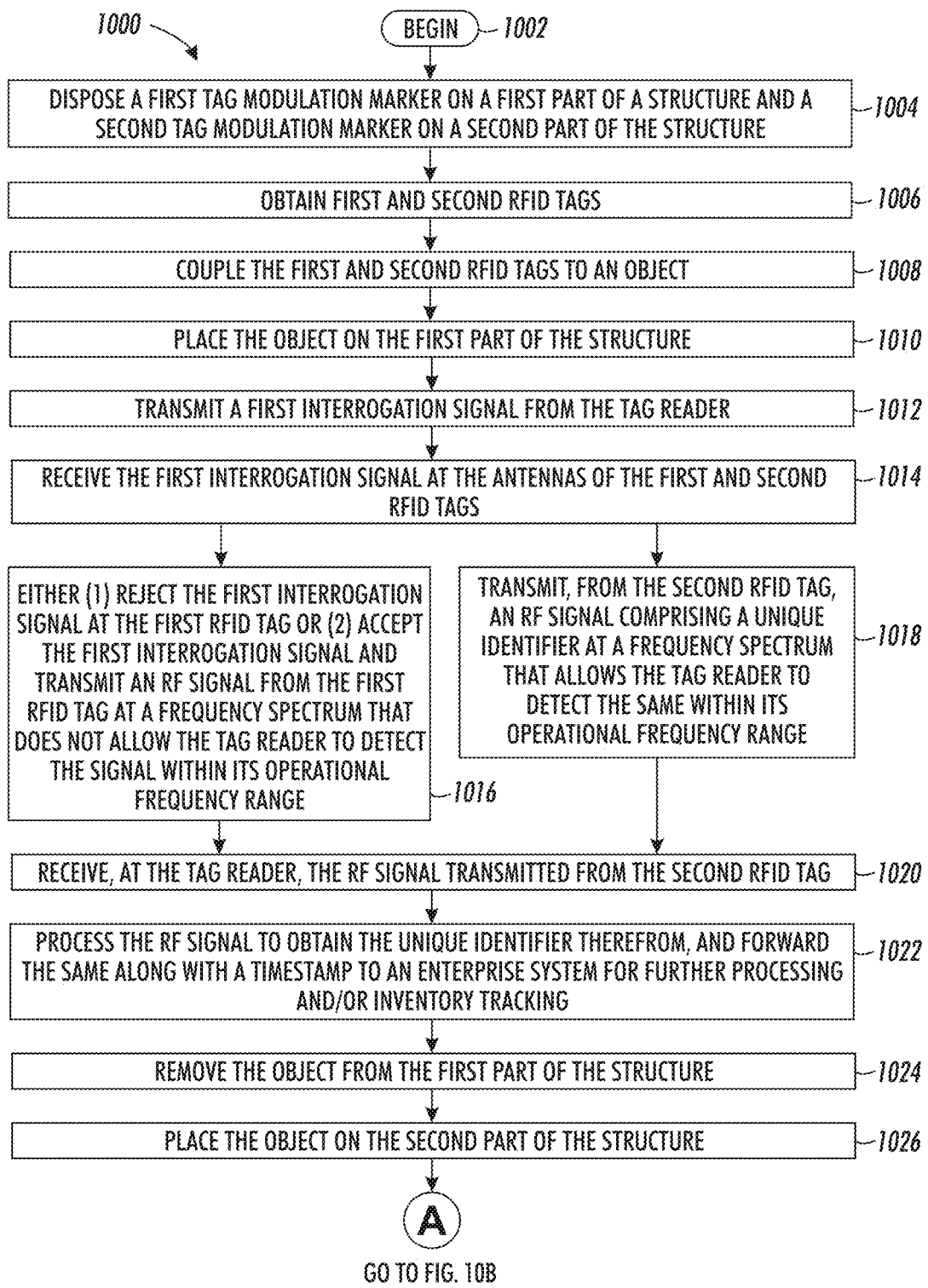
FIGS. 10A-10B (collectively referred to as "FIG. 10") provide a flow diagram of an illustrative method for detecting locations of objects in a facility.
Figure 10B:
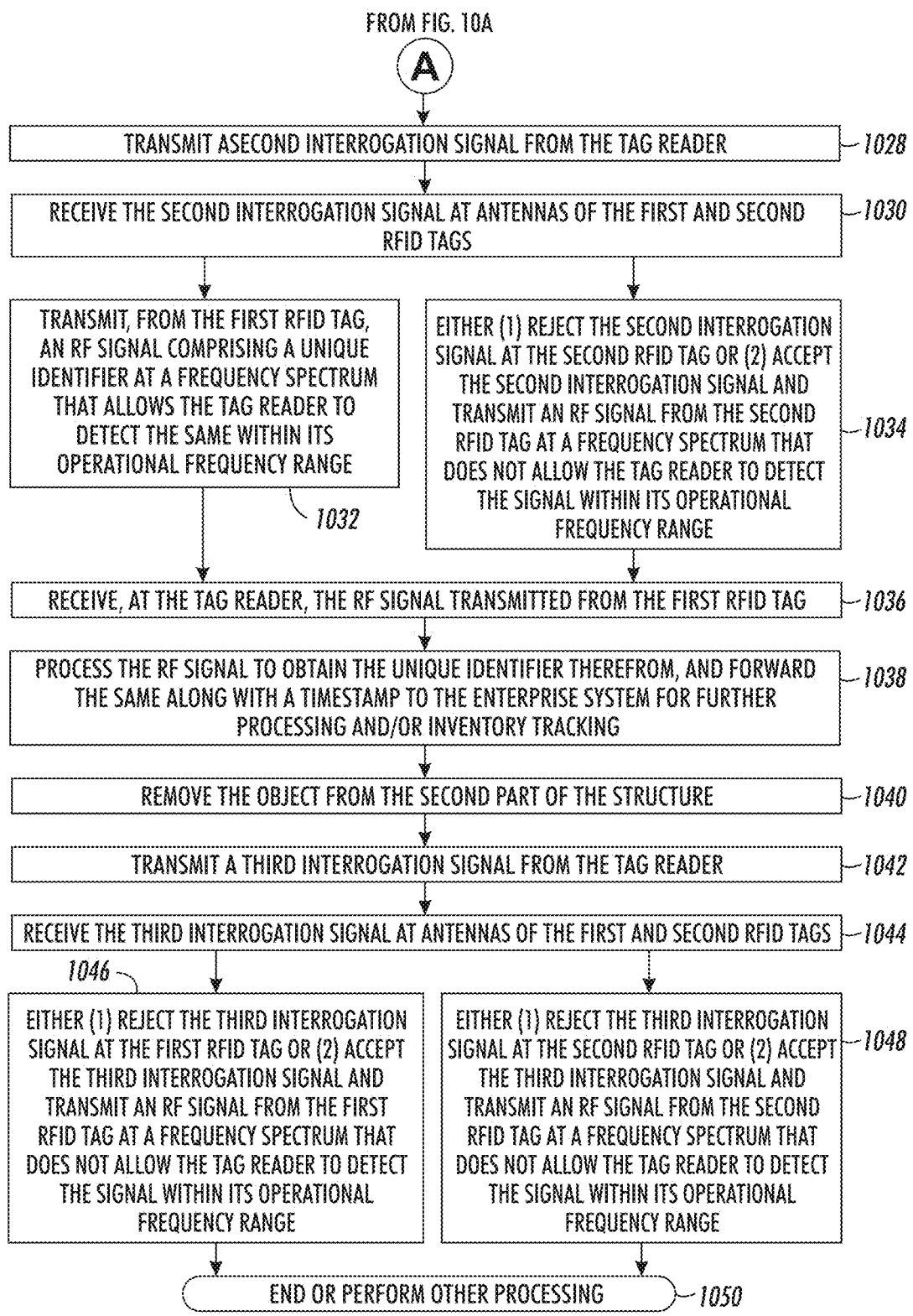

Referring now to FIGS. 10A-10B (collectively referred to as "FIG. 10"), there is provided a flow diagram of an illustrative method 1000 for detecting locations of objects (e.g., object 304, 316, 322, 328, 352, 360, 364 of FIG. 3) in a facility (e.g., RSF 330 of FIG. 3). FIGS. 10A-10B cover the scenario in which an object has two RFID tags coupled thereto with antennae designed to become functional when in proximity to respective tag modulation markers.

Method 1000 begins with 1002 and continues with 1004 where a first tag modulation marker (e.g., tag modulation marker 104 of FIGS. 1-2, or tag modulation marker 312, 318, 324, 356 of FIG. 3) is disposed on a first part (e.g., shelf 314, 320, 326, 358 of FIG. 3) of a structure (e.g., equipment 302, 350 of FIG. 3) and a second tag modulation marker (e.g., tag modulation marker 104 of FIGS. 1-2, or tag modulation marker 312, 318, 324, 356 of FIG. 3) is disposed on a second part (e.g., shelf 314, 320, 326, 358 of FIG. 3) of the structure. The first and second tag modulation markers have at least one different characteristic or property (e.g., a material type, a shape, a thickness, and a permittivity).

In 1006, first and second RFID tags (e.g., RFID tags $306_{1-4}$, $308_{1-4}$, $310_{1-4}$ of FIG. 3) are obtained. Each RFID tag comprises an antenna (e.g., antenna 602 of FIG. 6) configured to transmit and receive RF signals at a frequency that is within or outside of an operating frequency range of a tag reader (e.g., tag reader 332, 340 of FIG. 3), and at a relatively weak signal strength that provides a coverage area exclusive of the tag reader. The first and second RFID tags are coupled to an object (e.g., object 304, 316, 322, 328 of FIG. 3) in 1008.

Next in 1010, the object is then placed on the first part of the structure such that the first and second RFID tags are in proximity to the first tag modulation marker. Subsequently, the tag reader transmits a first interrogation signal (e.g., interrogation signal 208 of FIG. 2) in 1012. In 1014, the first interrogation signal is received at the antennas of the first and second RFID tags. As shown by 1016, the first RFID tag either (1) rejects the first interrogation signal at the first RFID tag or (2) accepts the first interrogation signal and transmits an RF signal from the first RFID tag at a frequency spectrum that does not allow the tag reader to detect the same within its operational frequency range.

As shown by 1018, an RF signal (e.g., RF signal 206 of FIG. 2) is transmitted from the second RFID tag at a frequency spectrum that allows the tag reader to detect the same within its operational frequency range. The RF signal comprises a unique identifier (e.g., unique identifier 624 of FIG. 6). The RF signal is received at the tag reader in 1020. The tag reader processes the RF signal to obtain the unique identifier therefrom, as shown by 1022. The unique identifier is forwarded along with a timestamp to an enterprise system (e.g., enterprise system 342 of FIG. 3) for further processing and/or inventory tracking.

In 1024-1026, the object is removed from the first part of the structure and placed on the second part of the structure. Thereafter, method 1000 continues with 1028 of FIG. 10B. As shown in FIG. 10B, 1028 involves transmitting a second interrogation signal from the tag reader. The first and second RFID tags receive the second interrogation signal in 1030.

In response to the second interrogation signal, an RF signal is transmitted in 1032 from the first RFID tag. The RF signal is transmitted at a frequency spectrum that allows the tag reader to detect the signal within its operational frequency range. In contrast, the second RFID tag either (1) rejects the second interrogation signal or (2) transmits an RF signal in response to the second interrogation signal at a frequency spectrum that does not allow the tag reader to detect the signal within its operational frequency range.

The RF signal transmitted from the first RFID tag is received at the tag reader 1036. The tag reader processes the RF signal to obtain the unique identifier therefrom. The unique identifier is forwarded along with a timestamp to the enterprise system for further processing and/or inventory tracking, as shown by 1038.

Thereafter in 1040, the object is removed from the second part of the structure. A third interrogation signal is transmitted from the tag reader in 1042. The third interrogation signal is received at the antennas of the first and second RFID tags in 1044. As shown by 1046-1048, neither of the first and second RFID tags are functional in this scenario, i.e., both RFID tags either (1) reject the third interrogation signal or (2) transmit an RF signal at a frequency spectrum that does not allow the tag reader to detect the signal within its operational frequency range. Subsequently, 1050 is performed where method 1000 ends or other processing is performed.

Figure 11A:
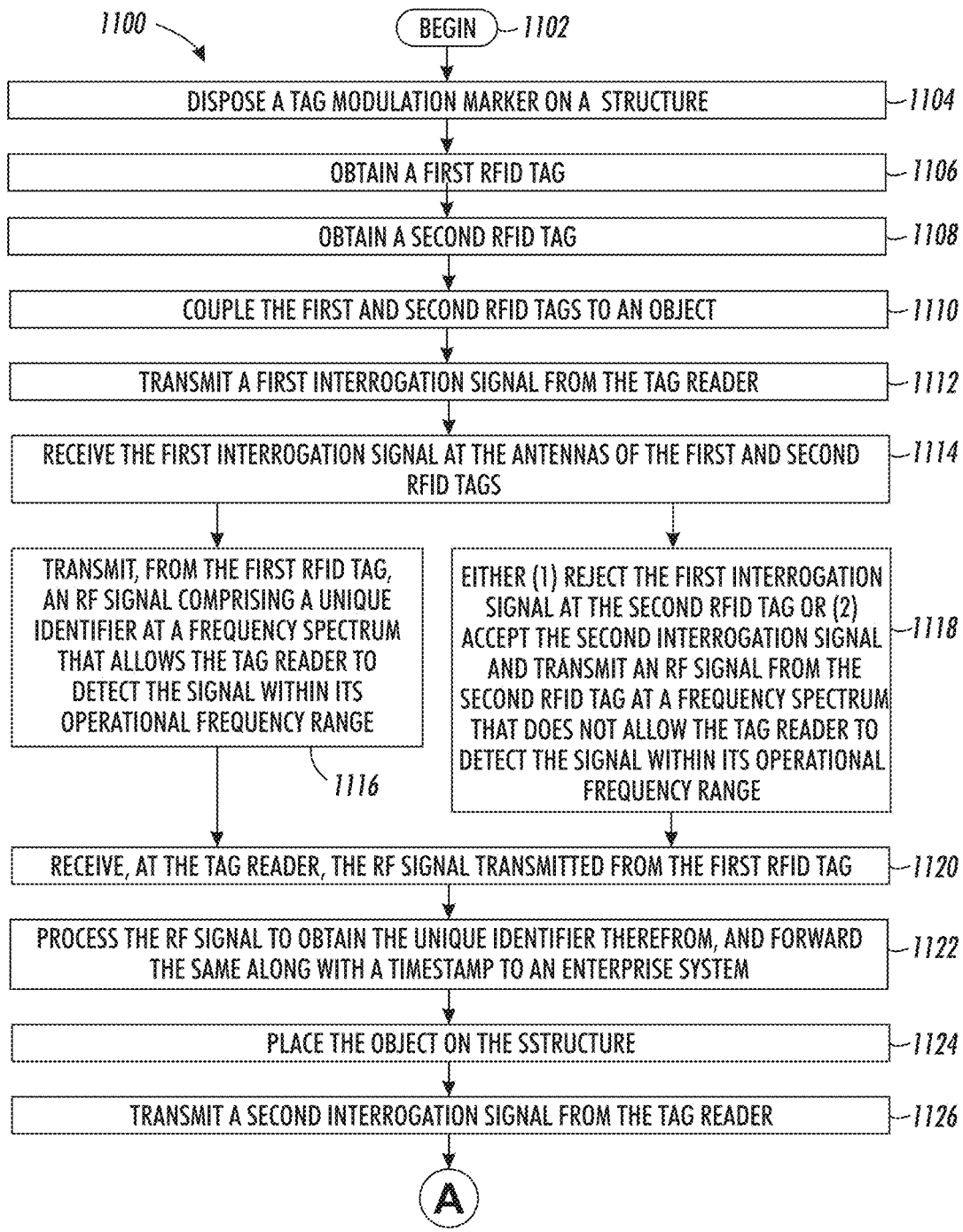
FIGS. 11A-11B (collectively referred to as "FIG. 11") provide a flow diagram of an illustrative method for detecting locations of an object in a facility.
Figure 11B:
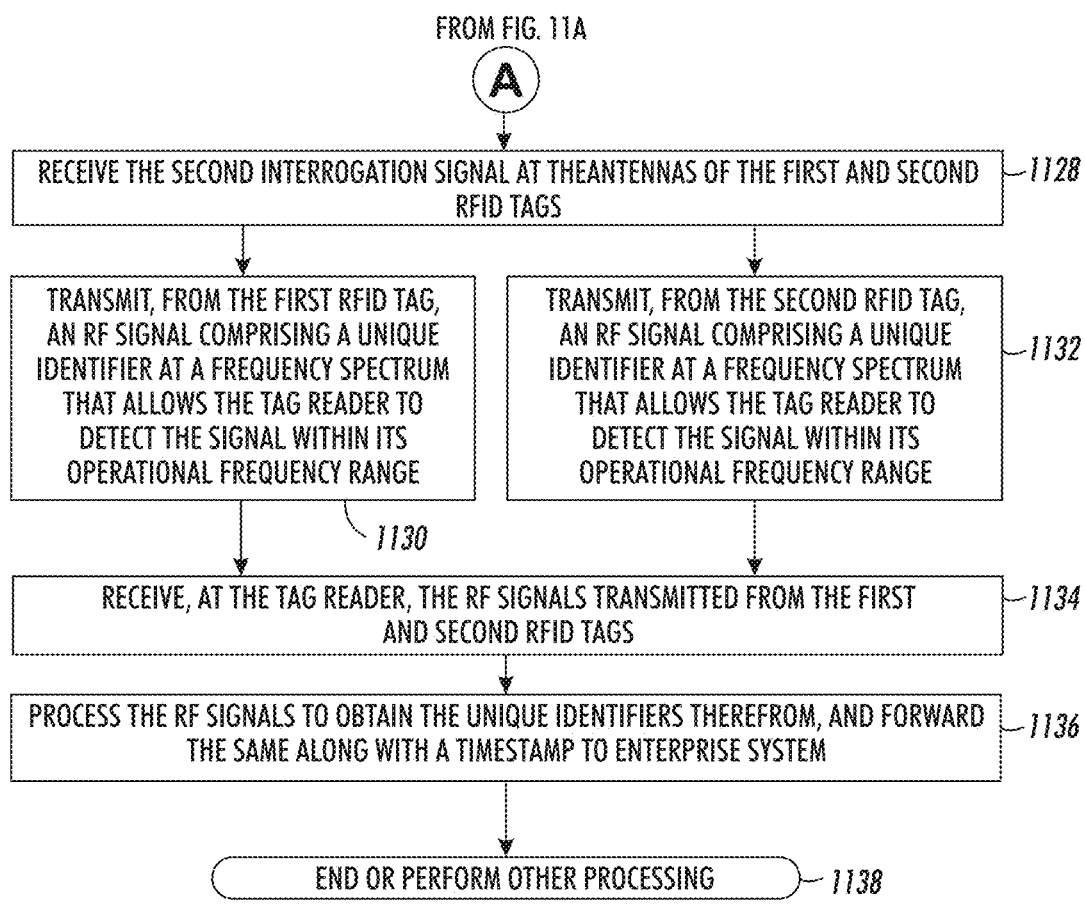

Referring now to FIGS. 11A-11B (collectively referred to as "FIG. 11"), there is provided a flow diagram of an illustrative method 1100 for detecting locations of an object (e.g., object 304, 316, 322, 328, 352, 360, 364 of FIG. 3) in a facility (e.g., RSF 330 of FIG. 3). FIGS. 11A-11B cover the scenario in which an object has a conventional RFID tag and a novel RFID tag coupled thereto such that the system can determine when the RFID tag is located on given structures in a facility (e.g., located on a shelf with a tag modulation marker or on a shelf absent of tag modulation marker). In this way, the tag reader can detect whether the object is in a facility and whether or not the object is on a particular structure.

Method 1100 begins with 1102 and continues with 1104 where a tag modulation marker (e.g., tag modulation marker 356 of FIG. 3) is disposed on a structure (e.g., equipment 350 or shelf 358 of FIG. 3). Next in 1106, a first RFID tag (e.g., RFID tag $351_1$ or $354_2$ of FIG. 3) is obtained. The first RFID tag is configured to operate at a frequency within an operational frequency range of a tag reader (e.g., tag reader 332 or 340 of FIG. 3) and/or at a signal strength that provides a coverage area inclusive of the tag reader. In 1108, a second RFID tag (e.g., RFID tag $306_5$ or $306_6$ of FIG. 3) is obtained. The second RFID tag is configured to operate at a frequency within or outside of an operational frequency range of the tag reader, and/or at a signal strength that provides a coverage area exclusive of the tag reader. In 1110, the first and second RFID tags are coupled to an object (e.g., object 352 or 360 of FIG. 3).

Thereafter in 1112, the tag reader transmits a first interrogation signal (e.g., interrogation signal 208 of FIG. 2). Next in 1114, the first interrogation signal is received at the antennas (e.g., antenna 602 of FIG. 6) of the first and second RFID tags. As shown by 1116-118, the first RFID tag is functional and the second RFID tag is not functional at this time. Accordingly, an RF signal is transmitted from the first RFID tag in response to the first interrogation signal. The RF signal comprises a unique identifier (e.g., unique ID 624 of FIG. 6) of the first RFID tag. The RF signal is transmitted at a frequency spectrum that allows the tag reader to detect the signal within its operational frequency range. In contrast, the second RFID tag either (1) rejects the first interrogation signal or (2) transmits an RF signal at a frequency spectrum that does not allow the tag reader to detect the signal within its operational frequency range.

In 1120, the RF signal transmitted from the first RFID tag is received at the tag reader. The tag reader processes the RF signal to obtain the unique identifier therefrom, as shown by 1122. The unique identifier is forwarded along with a timestamp to an enterprise system (e.g., enterprise system 342 of FIG. 3) for further processing and/or inventory tracking.

Subsequently in 1124, the object is placed on the structure such that at least the second RFID tag is in proximity with the tag modulation marker. A second interrogation signal is transmitted from the tag reader in 1126. Method 1100 then continues with 1128 of FIG. 11B. As shown in FIG. 11B, 1128 involves receiving the second interrogation signal at the antennas (e.g., antenna 602 of FIG. 6) of the first and second RFID tags. At this time, both RFID tags are functional as shown by 1130 and 1132, i.e., each RFID tag transmits an RF signal therefrom at a frequency spectrum that allows the tag reader to detect the signal within its operational frequency range. The RF signals include unique identifiers for the first and second RFID tags, respectively.

The RFID signals are received at the tag reader in 1134. The RF signals are processed by the tag reader to obtain the unique identifiers therefrom. The unique identifiers are forwarded along with timestamps to the enterprise system for further processing and/or inventory tracking, as shown by 1136. Subsequently, 1138 is performed where method 1100 ends or other processing is performed.

Figure 12:
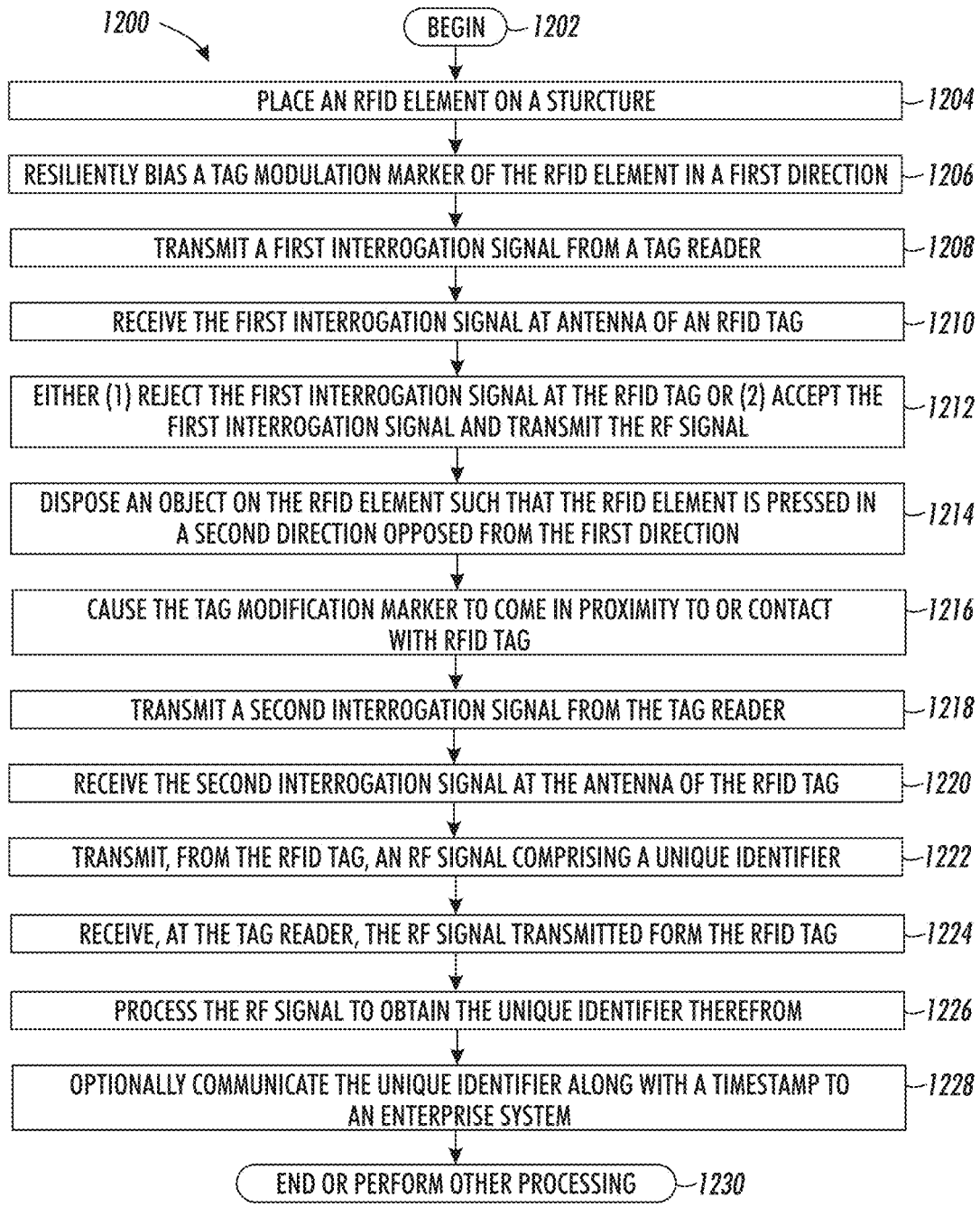
FIG. 12 provides a flow diagram of an illustrative method for detecting locations of an object in a facility using a depressible RFID element.

Referring now to FIG. 12, there is provided a flow diagram of an illustrative method 1200 for detecting locations of an object (e.g., object 304, 316, 322, 328, 352, 360, 364 of FIG. 3) in a facility (e.g., RSF 330 of FIG. 3) using a depressible RFID element. FIG. 12 covers the scenario in which the structure is a smart structure comprising an RFID element configured to detect when an object is disposed thereon or a user is depressing the same.

Method 1200 begins with 1202 and continues with 1204 where an RFID element (e.g., RFID element 366 of FIG. 3-5) is disposed on a structure (e.g., shelf 368 of FIG. 3B). In 1206, a tag modulation marker (e.g., tag modulation marker 402 of FIGS. 4-5) is resiliently biased in a first direction (e.g., direction 410 of FIG. 4). The biasing may be accomplished by a resilient member (see element 408 of FIG. 4) that pushes the marker away from the tag (or the tag away from the marker) unless the resilient member is depressed. The first direction can be a vertical direction away from the structure, or a horizontal direction aligned with a plane defined by the structure, which separates the tag modulation marker from the RFID tag.

A first interrogation signal is transmitted from the tag reader (e.g., tag reader 332 or 340 of FIG. 3) in 1208. The first interrogation signal is received in 1210 at the antenna (e.g., antenna 602 of FIG. 6) of the RFID tag (e.g., RFID tag 404 of FIGS. 4-5). The RFID tag is not functional at this time since the RFID tag is not in proximity to or in contact with the tag modulation marker. Accordingly as shown in 1212, the RFID tag either (1) rejects the first interrogation signal whereby an RF signal is not transmitted therefrom or (2) accepts the first interrogation signal whereby an RF signal is transmitted therefrom at a frequency spectrum that does not allow the tag reader to detect the signal within its operational frequency range.

Subsequently in 1214, an object (e.g., object 364 of FIG. 3B) is disposed on the RFID element or a user pushes on the RFID element such that the RFID element is depressed in a second direction (e.g., direction 500 of FIG. 5) opposed from the first direction (e.g., a direction towards the structure). This depression of the RFID element's resilient member causes the tag modulation marker to come in proximity to or contact with the RFID tag.

Thereafter in 1218, a second interrogation signal is transmitted from the tag reader. The second interrogation signal is received at the antenna (e.g., antenna 602 of FIG. 6) of the RFID tag in 1220. At this time, the RFID element is functional since the RFID tag and tag modulation marker are in proximity or contact with each other. Accordingly as shown in 1222, an RF signal is transmitted from the RFID tag at a frequency spectrum that allows the tag reader to detect the signal within its operational frequency range. The RF signal comprises the unique identifier (e.g., unique ID 624 of FIG. 6) of the RFID tag. The RF signal is received at the tag reader in 1224. In 1226, the tag reader processes the RF signal to obtain the unique identifier therefrom. The unique identifier is optionally communicated along with a timestamp to an enterprise system (e.g., enterprise system 342 of FIG. 3) for further processing and/or inventory tracking, as shown by 1228. When this method is used for a push button, a user input will be identified by the enterprise system and a proper action will be performed (e.g., display related information on an electronic display, or add items on an empty shelf, etc.). Subsequently 1230 is performed where method 1200 ends or other processing is performed.

Figure 13:
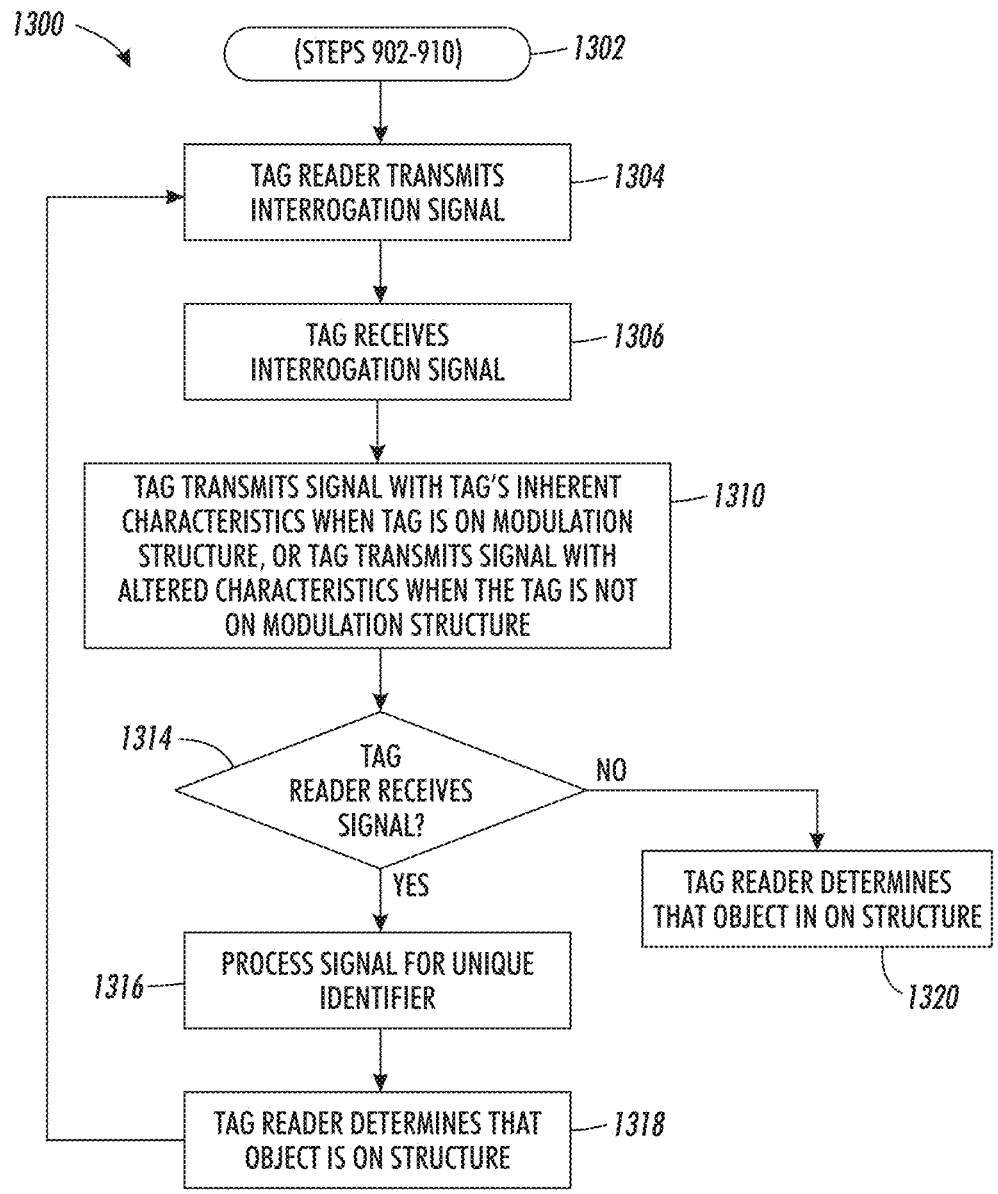
FIG. 13 provides a flow diagram of an illustrative method for detecting locations of objects in a facility.

Referring now to FIG. 13, there is provided a flow diagram of an illustrative method 1300 for operating a tag system. Method 1300 begins with 1302 where operations of blocks 902-910 of FIG. 9 are performed. In next 1304, the tag reader transmits an interrogation signal. The interrogation signal is received by the tag in 1306. In 1310, the tag transmits a signal with its inherent characteristics (e.g., at a frequency spectrum that allows a tag reader to detect the signal within its operational frequency range) when it is on the modulation structure, or transmits a signal with altered characteristics (e.g., at a frequency spectrum that does not allow the tag reader to detect the signal within its operational frequency range) when it is not on the modulation structure. Upon completing 1310, a determination is made as to whether or not the tag reader receives a signal from the tag. If not [1314:NO], then the tag reader determines that an object is not on a structure. If so [1314:YES], then the tag reader processes the signal for a unique identifier in 1316. The tag reader also determines that the object is on the structure as shown by 1318. Upon completing 1318, method 1300 returns to 1304.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a tag system, comprising:
by a tag having an antenna:
when the tag is not proximate to a tag modulation marker, emitting a wireless signal from the antenna at a first frequency spectrum; and
when the tag is proximate to the tag modulation marker, emitting a wireless signal from the antenna at a second frequency spectrum, where the second frequency spectrum is different from the first frequency spectrum.

2. The method of claim 1, wherein the wireless signal emitted at the first frequency spectrum is not detectable by a tag reader that is in a certain location, while the wireless signal emitted at the second frequency spectrum is detectable by the tag reader in the certain location.

3. The method according to claim 1, wherein the tag is coupled to a first item and the tag modulation marker is coupled to a second item.

4. The method according to claim 3, wherein the first item comprises an object that is part of an inventory and the second item comprises storage equipment that is part of an infrastructure for storing inventory.

5. The method according to claim 3, wherein the first item comprises equipment that is part of an infrastructure and the second item comprises an object that is part of an inventory.

6. The method according to claim 5, wherein modulation of the communications behavior of the tag is achieved by changing a resonant frequency of the tag, attenuating an amplitude of a signal generated by the tag, or shifting a phase of the signal generated by the tag.

7. The method according to claim 6, further comprising causing the tag modulation marker to move in a direction towards the tag, or the tag to move in a direction toward the tag modulation marker by placing an object on a structure that includes the tag modulation marker, the tag, and a resilient member.

8. The method according to claim 3, wherein the first item comprises a support plate of an RFID element and the second item comprises at least one resilient member of the RFID element.

9. The method according to claim 1, wherein the tag modulation marker is configured to modulate a communications behavior of the tag.

10. The method according to claim 1, wherein the tag modulation marker comprises a glass plate.

11. The method according to claim 1, further comprising resiliently biasing the tag modulation marker in a direction away from the tag, or resiliently biasing the tag in a direction away from the tag modulation marker.

12. The method according to claim 11, further comprising storing the location in an enterprise system for inventory tracking purposes.

13. The method according to claim 1, further comprising detecting a location of an object within a facility when the wireless signal emitted at the second frequency spectrum is received at a tag reader.

14. A tag system, comprising:
a tag comprising an antenna and being coupled to a first item; and
a tag modulation marker coupled to a second item and configured to modulate a communications behavior of the RF antenna of the tag;
wherein the RF antenna of the tag is configured to:
transmit a first wireless signal at a first frequency spectrum that does not allow a tag reader to detect the first wireless signal within an operating frequency range of the tag reader when the tag is not within a certain distance range of the tag modulation marker; and
transmit a second wireless signal at a second frequency spectrum that allows the tag reader to detect the second wireless signal within the operating frequency range of the tag reader, where in the second frequency spectrum is different than the first frequency spectrum.

15. The tag system according to claim 14, wherein:
the first item comprises an object that is part of an inventory; and
the second item comprises storage equipment that is part of an infrastructure that stores the inventory.

16. The tag system according to claim 14, wherein:
the first item comprises equipment that is part of an infrastructure for storing an inventory; and
the second item comprises an object that is part of the inventory.

17. The tag system according to claim 14, wherein:
either or the first item or the second item comprises a support plate; and
the other of the first item and the second item comprises at least one resilient member that is attached to the support plate.

18. The tag system according to claim 17, wherein the at least one resilient member either resiliently biases the tag modulation marker in a direction away from the tag or resiliently biases the tag in a direction away from the modulation marker.

19. The tag system according to claim 14, wherein modulation of the communications behavior of the tag is achieved by changing a resonant frequency of the RF antenna, attenuating an amplitude of a signal generated by the RF antenna, or shifting a phase of the signal generated by the RF antenna.

20. The tag system according to claim 14, wherein the tag modulation marker comprises a glass plate.

21. The tag system according to claim 14, further comprising a tag reader configured to detect a location of an object within a facility when the second wireless signal is received at the tag reader.

22. The tag system according to claim 21, wherein the location is communicated to an enterprise system for inventory tracking purposes.

23. The tag system according to claim 14, wherein the RF antenna comprises a patch antenna.

24. The tag system according to claim 14, wherein the RF antenna is comprises printed conductive traces on a plastic substrate.

* * * * *